(12) United States Patent
Wick et al.

(10) Patent No.: US 10,681,170 B2
(45) Date of Patent: *Jun. 9, 2020

(54) SYSTEMS AND METHODS FOR DETERMINING THE POPULARITY OF A USER BASED ON AGGREGATED POPULARITY MEASUREMENTS OF OTHER USERS

(71) Applicant: Oath Inc., Dulles, VA (US)

(72) Inventors: Andrew L. Wick, McLean, VA (US); Jeremy Rephlo, Reston, VA (US); June R. Herold, Falls Church, VA (US); Eric Bosco, McLean, VA (US); Justin Uberti, Kirkland, WA (US)

(73) Assignee: Oath Inc., Dulles, VA (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/667,588

(22) Filed: Aug. 2, 2017

(65) Prior Publication Data

US 2017/0331917 A1 Nov. 16, 2017

Related U.S. Application Data

(63) Continuation of application No. 11/464,816, filed on Aug. 15, 2006, now Pat. No. 9,742,615.

(Continued)

(51) Int. Cl.
*H04L 29/08* (2006.01)
*H04L 29/06* (2006.01)

(52) U.S. Cl.
CPC ............ *H04L 67/306* (2013.01); *H04L 29/06* (2013.01); *H04L 67/02* (2013.01); *H04L 67/22* (2013.01); *H04L 67/24* (2013.01)

(58) Field of Classification Search
CPC . G06F 16/24578; G06F 16/287; G06Q 10/10; G06Q 50/01; H04L 67/02; H04L 67/22; H04L 67/24; H04L 67/306
See application file for complete search history.

(56) References Cited

U.S. PATENT DOCUMENTS

| | | | |
|---|---|---|---|
| 5,533,110 A | 7/1996 | Pinard et al. | |
| 5,564,261 A | 10/1996 | Kiner | |

(Continued)

FOREIGN PATENT DOCUMENTS

| | | | |
|---|---|---|---|
| GB | 2319137 | 5/1998 | |
| GB | 2368747 A * | 5/2002 | ............ G06Q 30/02 |

(Continued)

OTHER PUBLICATIONS

Advisory Action issued in U.S. Appl. No. 10/146,814, dated Jul. 10, 2008 (3 pages).

(Continued)

*Primary Examiner* — Lance Leonard Barry
(74) *Attorney, Agent, or Firm* — Bookoff McAndrews, PLLC

(57) ABSTRACT

A method for determining a popularity of a user includes identifying an online identity for which a popularity measurement is to be determined, and identifying one or more other online identities based, at least in part, on their being within a specified number of degrees of separation of the online identity. Popularity measurements for the other users are accessed and aggregated, and a popularity measurement for the user is determined based on at least the aggregated popularity measurements for the other online identities. A graphical user interface includes a first identifier specification mechanism that enables specification of an identifier of a first online identity, and a second identifier specification mechanism that enables specification of an identifier of a second online identity. The graphical user interface includes (Continued)

a display of an indication of whether a popularity of the first online identity exceeds a popularity of the second online identity.

20 Claims, 13 Drawing Sheets

Related U.S. Application Data

(60) Provisional application No. 60/707,965, filed on Aug. 15, 2005, provisional application No. 60/807,688, filed on Jul. 18, 2006.

(56) References Cited

U.S. PATENT DOCUMENTS

| | | | |
|---|---|---|---|
| 5,583,920 | A | 12/1996 | Wheeler, Jr. |
| 5,610,910 | A | 3/1997 | Focsaneanu et al. |
| 5,650,994 | A | 7/1997 | Daley |
| 5,764,916 | A | 6/1998 | Busey et al. |
| 5,790,800 | A | 8/1998 | Gauvin et al. |
| 5,835,724 | A | 11/1998 | Smith |
| 5,848,134 | A | 12/1998 | Sekiguchi et al. |
| 5,859,979 | A | 1/1999 | Tung et al. |
| 5,919,247 | A | 7/1999 | Van Hoff et al. |
| 5,951,646 | A | 9/1999 | Brandon |
| 5,956,716 | A | 9/1999 | Kenner et al. |
| 5,983,369 | A | 11/1999 | Bakoglu et al. |
| 5,987,407 | A | 11/1999 | Wu et al. |
| 6,006,179 | A | 12/1999 | Wu et al. |
| 6,070,171 | A | 5/2000 | Snyder et al. |
| 6,144,991 | A | 11/2000 | England |
| 6,192,395 | B1 | 2/2001 | Bemer et al. |
| 6,195,354 | B1 | 2/2001 | Skalecki et al. |
| 6,212,548 | B1 | 4/2001 | DeSimone et al. |
| 6,223,213 | B1 | 4/2001 | Cleron et al. |
| 6,233,577 | B1 | 5/2001 | Ramasubramani et al. |
| 6,249,740 | B1 | 6/2001 | Ito et al. |
| 6,306,004 | B1 | 10/2001 | Farrar |
| 6,317,776 | B1 | 11/2001 | Broussard et al. |
| 6,393,464 | B1 | 5/2002 | Bieterman |
| 6,405,035 | B1 | 6/2002 | Singh |
| 6,405,249 | B1 | 6/2002 | Matsuda et al. |
| 6,430,344 | B1 | 8/2002 | Dixon et al. |
| 6,529,475 | B1 | 3/2003 | Wan et al. |
| 6,564,248 | B1 | 5/2003 | Budge et al. |
| 6,574,599 | B1 | 6/2003 | Lim et al. |
| 6,677,976 | B2 | 1/2004 | Parker et al. |
| 6,738,822 | B2 | 5/2004 | Fukasawa et al. |
| 6,747,970 | B1 | 6/2004 | Lamb et al. |
| 6,748,421 | B1 | 6/2004 | Ozkan et al. |
| 6,757,365 | B1 | 6/2004 | Bogard |
| 6,757,732 | B1 | 6/2004 | Sollee et al. |
| 6,785,681 | B2 | 8/2004 | Keskar et al. |
| 6,795,863 | B1 | 9/2004 | Doty, Jr. |
| 6,807,574 | B1 | 10/2004 | Partovi et al. |
| 6,857,006 | B1 | 2/2005 | Nishizawa |
| 6,879,665 | B1 | 4/2005 | Cook et al. |
| 6,920,478 | B2 | 7/2005 | Mendiola et al. |
| 6,996,520 | B2 | 2/2006 | Levin |
| 7,039,676 | B1 | 5/2006 | Day et al. |
| 7,043,530 | B2 | 5/2006 | Isaacs et al. |
| 7,065,186 | B1 | 6/2006 | Myers et al. |
| 7,082,407 | B1 | 7/2006 | Bezos et al. |
| 7,117,254 | B2 * | 10/2006 | Lunt ..................... G06Q 10/10 709/218 |
| 7,120,687 | B1 | 10/2006 | Tessman, Jr. |
| 7,139,797 | B1 | 11/2006 | Yoakum et al. |
| 7,171,473 | B1 | 1/2007 | Eftis et al. |
| 7,233,992 | B1 | 6/2007 | Muldoon et al. |
| 7,437,413 | B2 | 10/2008 | Okuyama et al. |
| 7,512,652 | B1 | 3/2009 | Appelman |
| 7,716,287 | B2 | 5/2010 | Appelman |
| 7,765,484 | B2 | 7/2010 | Roskind |
| 7,774,711 | B2 | 8/2010 | Valeski |
| 7,945,674 | B2 | 5/2011 | Appelman |
| 9,742,615 | B1 * | 8/2017 | Wick ..................... G06Q 50/01 |
| 2002/0023134 | A1 | 2/2002 | Roskowski et al. |
| 2002/0049717 | A1 | 4/2002 | Routtenberg et al. |
| 2002/0056123 | A1 | 5/2002 | Liwerant et al. |
| 2002/0175953 | A1 | 11/2002 | Lin |
| 2003/0009385 | A1 | 1/2003 | Tucciarone et al. |
| 2003/0028524 | A1 | 2/2003 | Keskar et al. |
| 2003/0212804 | A1 | 11/2003 | Heshemi |
| 2003/0225847 | A1 | 12/2003 | Heikes et al. |
| 2003/0236835 | A1 | 12/2003 | Levi et al. |
| 2005/0076241 | A1 | 4/2005 | Appelman |
| 2005/0082620 | A1 | 4/2005 | Cheng |
| 2005/0102202 | A1 | 5/2005 | Linden et al. |
| 2005/0154913 | A1 | 7/2005 | Barriga et al. |
| 2005/0198131 | A1 | 9/2005 | Appelman |
| 2005/0198173 | A1 | 9/2005 | Evans |
| 2005/0216300 | A1 | 9/2005 | Appelman |
| 2007/0250566 | A1 | 10/2007 | Appelman |

FOREIGN PATENT DOCUMENTS

| | | | |
|---|---|---|---|
| GB | 2368747 | * | 8/2002 |
| JP | 8-314826 | | 11/1996 |
| JP | 2000-049901 | | 2/2000 |
| WO | WO 97/14234 | | 4/1997 |
| WO | WO 98/47270 | | 10/1998 |
| WO | WO 99/34628 | | 7/1999 |
| WO | WO 99/48011 | | 9/1999 |
| WO | WO 00/16201 | | 3/2000 |
| WO | WO 00/24154 | | 4/2000 |
| WO | WO 00/60809 | | 10/2000 |
| WO | WO 01/24036 | | 4/2001 |
| WO | WO 01/43357 | | 5/2001 |
| WO | WO 01/72020 | | 9/2001 |
| WO | WO 01/80079 | | 10/2001 |
| WO | WO 02/09437 | | 1/2002 |
| WO | WO 02/35781 | | 5/2002 |
| WO | WO 02/62039 | | 8/2002 |
| WO | WO 04/28178 | | 4/2004 |

OTHER PUBLICATIONS

Advisory Action issued in U.S. Appl. No. 10/633,636, dated Sep. 18, 2007 (3 pages).

Advisory Action issued in U.S. Appl. No. 11/015,476, dated Apr. 9, 2010 (3 pages).

Advisory Action issued in U.S. Appl. No. 11/015,476, dated Feb. 1, 2010 (6 pages).

Advisory Action issued in U.S. Appl. No. 11/079,522, dated May 25, 2010 (4 pages).

Gupta et al., "A Reputation System for Peer-to-Peer Networks," Jun. 1-3, 2003, NOSSDAV '03 Monterey, California, pp. 144-152, (9 pages).

"About File Transfers," AOL Instant Messenger, version 4.3, Help Documentation, available on Jul. 21, 2001, (5 pages).

"Push to Talk™ Services," 1 page, retrieved from http://www.nextel.com/services/directconnect/ptt_overview.shtml on Dec. 29, 2003.

"The Internet—The Advent of New Forms of Communication," 4 pages, retrieved from http://journal.fujitsu.com/248e/e48now.html on Dec. 29, 2003.

"AOL Instant Messenger," retrieved from http://web.archive.org/web/20010721193059/http://aim.com on Aug. 26, 2005, (7 pages).

Archive.org archived copy of "AOL Instant Messenger," Jul. 21, 2001 (7 pages).

Archive.org archived copy of the Morpheus 1.9.1 download page, retrieved on Oct. 8, 2001 (2 pages).

Archive.org archived copy of the MusicCity Morpheus download page, retrieved from cjnet Download.com on Feb. 14, 2007 (2 pages).

Australian Patent Application No. 2002340039; Office Action dated Apr. 7, 2006 (2 pages).

BuddyGopher: About, retrieved from http://web.archive.org/web/20040713002836/http://www.buddygopher.com/ on Sep. 28, 2005 (4 pages).

(56) References Cited

OTHER PUBLICATIONS

BuddyGopher: We Love Away Messages!, "BuddyGopher simultaneously checks the away messages of your favorite AIM buddies," retrieved from http://web.archive.org/web/20040924104001/http://www.buddygopher.com/ on Sep. 28, 2005 (2 pages).
Canadian Patent Application No. 2,462,037; Office Action dated Feb. 12, 2009 (8 pages).
Chinese Patent Application No. 02821420X; Office Action dated Jul. 7, 2006, (5 pages).
Supplementary European Search Report issued in European Application No. 05 72 8303, dated Jan. 9, 2009, 2 pages.
Courter et al., "Mastering Microsoft Outlook 2000 Premium Edition," Sybex Inc., Alameda, California, 2000, pp. 167-169.
Decision on Appeal issued in U.S. Appl. No. 10/146,814, dated Mar. 22, 2010 (13 pages).
Dodgeball.com: mobile social software, "help: text messaging," available on Oct. 13, 2004, retrieved from http://web.archive.org/web/20041013034241_/www.dodgeball.com/social/help_text.php on Sep. 28, 2005 (3 pgs.).
Dodgeball.com:mobile social software, "help: the basics," available on Oct. 9, 2004, retrieved from http://web,archive.org/web/20041009200739/www.dodgeball.com/social/help_basics.php on Sep. 28, 2005 (2 pgs.).
Dodgeball.com: mobile social software, "help: use it," retrieved from http://web.archive.ora/web/20041009201853/www.dodgeball.com/social/help_useit.php on Sep. 28, 2005 (2 pgs.).
Dodgeball.com: mobile social software, "Hook up with friends. Discover what's around you," retrieved from http://web.archive.org/web/20041130034344/www.dodgeball.com/social/index.php on Sep. 28, 2005 (2 pgs.).
Dutta-Roy, "Virtual Meetings with Desktop Conferencing," IEEE Spectrum, vol. 35, No. 7, Jul. 1, 1998, pp. 47-56, and 66.
Eschenburg, Wo laufen sie denn?, Oct. 26, 1998, pp. 92-95.
International Search Report in International Patent Application No. PCT/US 01/07319, issued by the European Patent Office (2 pages).
European Application No. 02778374.5-1238, Communication dated Aug. 31, 2009, issued by European Patent Office (8 pages).
European Application No. 02778374.5-1238, Communication dated Sep. 5, 2006, issued by European Patent Office (3 pages).
Examiner's Answer issued in U.S. Appl. No. 10/146,814, dated Jan. 12, 2009 (19 pages).
Decision on Appeal issued in U.S. Appl. No. 10/633,636, dated Feb. 1, 2010 (10 pages).
Examiner's Answer issued in U.S. Appl. No. 10/633,636, dated Apr. 17, 2008 (11 pages).
Examiner's Answer issued in U.S. Appl. No. 11/015,476, dated Aug. 5, 2010 (16 pages).
Examiner's Answer issued in U.S. Appl. No. 11/079,522, dated Aug. 31, 2010 (12 pages).
Final Office Action issued in U.S. Appl. No. 10/633,636, dated Nov. 9, 2010 (11 pages).
Final Office Action issued in U.S. Appl. No. 10/633,636, dated Jun. 20, 2007 (10 pages).
Final Office Action issued in U.S. Appl. No. 11/015,424, dated Nov. 3, 2008 (46 pages).
Final Office Action issued in U.S. Appl. No. 11/015,424, dated Oct. 19, 2009, (59 pages).
Final Office Action issued in U.S. Appl. No. 11/079,522, dated Feb. 18, 2010 (11 pages).
Final Office Action issued in U.S. Appl. No. 11/237,718, dated Oct. 30, 2009 (21 pages).
Final Office Action issued in U.S. Appl. No. 12/336,880, dated Mar. 2, 2011 (23 pages).
"GLWebMail 2.0 is released!," retrieved from http://web.archive.org/web/20010418153714//http://www.gordano.com (2 pages).
Hartenstein, et al., "xhtalk 2.9," Nov. 1992 (6 pages).
Hearsy, "Support Vector Machines," IEEE Intelligent Systems, Jul./Aug. 1998, pp. 18-28.
IBM, "Configuring Sametime Servers in Your Domino Environment," May 1, 2000 (14 pages).

International Application No. PCT/US00/35160, International Search Report dated Apr. 11, 2003 (3 pages).
International Application No. PCT/US02/30730, International Search Report dated Jan. 9, 2003 (5 pages).
Isaacs, "Example UI Spec: Sound Instant Messages," retrieved from http://www.uidesigns.com/spec/d-sims.html on Jun. 26, 2003 (2 pages).
Jensen, et al., "Finding Others Online: Reputation Systems for Social Online Spaces," Apr. 20-25, 2002, CHI, Minneapolis, Minnesota, vol. 4, Issue 1, pp. 447-454.
Kohda et al., "IMPP: A new Instant Messaging Standard and Its Impact on Internet Business," Dec. 2000, Fujitsu Sci. Tech. J., 36, 2, pp. 147-153.
Lotus Sametime 1.5 1999 (4 pages).
Mariano, "Morpheus 1.9 to be unleashed," Jun. 10, 2002 (6 pages).
Marklein, "Students have 'away' with words," Mar. 28, 2004, USA Today, http://www.usatoday.com/tech/news/2004-03-28-aways-messages-usat_x.htm, 4 pages.
Matsumoto, et al., "Chocoa Communicator—A New Communication System Based on Awareness and Text Communications ," FUJITSU Sci. Tech. J.,36,2, pp. 154-161, Dec. 2000.
Muller, "Dial 1-800-Internet," Feb. 1996, pp. 83-84, 86, and 88.
Mutton, "PieSpy Social Network Bot Inferring and Visualizing Social Networks IRC," Dec. 4, 2003, http://web.archive.org/web/20031204185952/http://jibble.org/piespy, 17 pages.
Wingfield, "Changing Chat—Instant Messaging is Taking Off, and for Some Users It's Nuzzling Out the Phone," Asian WSJ, Sep. 2000, (5 pages).
Notice of Allowance issued in U.S. Appl. No. 10/146,814, dated Jan. 20, 2011, (7 pages).
Notice of Allowance issued in U.S. Appl. No. 10/146,814, dated Oct. 1, 2010, (7 pages).
Notice of Allowance issued in U.S. Appl. No. 10/184,002, dated Jul. 24, 2008, (16 pages).
Notice of Allowance issued in U.S. Appl. No. 11/015,424, dated Feb. 17, 2010, (13 pages).
Notice of Allowance issued in U.S. Appl. No. 11/237,718, dated Apr. 2, 2010, (6 pages).
Notice of Allowance issued in U.S. Appl. No. 10/134,437, dated Oct. 2, 2009, (6 pages).
Office Action dated May 12, 2008, issued by Japan Patent Office in Japan Patent No. 2003-533140 (5 pages).
Final Office Action issued in U.S. Appl. No. 09/843,788, dated Apr. 19, 2007, (17 pages).
Office Action issued in U.S. Appl. No. 10/134,437, dated Feb. 11, 2008, (34 pages).
Final Office Action issued in U.S. Appl. No. 10/134,437, dated May 18, 2006, (26 pages).
Final Office Action issued in U.S. Appl. No. 10/134,437 dated Sep. 18, 2008, (32 pages).
Advisory Action issued in U.S. Appl. No. 10/134,437, dated Aug. 21, 2006, (3 pages).
Office Action issued in U.S. Appl. No. 10/134,437, dated Mar. 10, 2009, (31 pages).
Office Action issued in U.S. Appl. No. 10/134,437, dated Nov. 1, 2005 (21 pages).
Notice of Non-Compliant Appeal Brief issued in U.S. Appl. No. 10/134,437, dated Sep. 6, 2007, (2 pages).
Office Action issued in U.S. Appl. No. 10/134,437, dated Sep. 18, 2008, (30 pages).
Office Action issued in U.S. Appl. No. 10/146,814, dated Sep. 20, 2005, (10 pages).
Office Action issued in U.S. Appl. No. 10/146,814, dated May 22, 2006, (11 pages).
Advisory Action issued in U.S. Appl. No. 10/146,814, dated Feb. 21, 2007, (3 pages).
Final Office Action issued in U.S. Appl. No. 10/146,814, dated Apr. 15, 2008, (20 pages).
Final Office Action issued in U.S. Appl. No. 10/746,232, dated Oct. 30, 2009, (13 pages).
Notice of Allowance issued in U.S. Appl. No. 10/746,232, dated Jan. 18, 2011, (9 pages).

(56) References Cited

OTHER PUBLICATIONS

Final Office Action issued in U.S. Appl. No. 10/746,230, dated Oct. 5, 2009, (9 pages).
Advisory Action issued in U.S. Appl. No. 10/746,230, dated Feb. 18, 2010, (2 pages).
Notice of Allowance issued in U.S. Appl. No. 10/746,230, dated Apr. 9, 2010, (6 pages).
Notice of Allowance issued in U.S. Appl. No. 10/746,230, dated Jan. 6, 2011, (5 pages).
Office Action issued in U.S. Appl. No. 11/464,816, dated Nov. 24, 2009, (16 pages).
Final Office Action issued in U.S. Appl. No. 11/464,816, dated Jun. 8, 2010, (23 pages).
Office Action issued in U.S. Appl. No. 11/464,816, dated Mar. 16, 2011, (22 pages).
Final Office Action issued in U.S. Appl. No. 11/015,423, dated Nov. 19, 2009, (16 pages).
Advisory Action issued in U.S. Appl. No. 11/015,423, dated Mar. 10, 2010, (6 pages).
Examiner's Answer issued in U.S. Appl. No. 11/015,423, dated Sep. 2, 2010 (18 pages).
Office Action issued in U.S. Appl. No. 11/015,423, dated Dec. 9, 2010, (15 pages).
Final Office Action issued in U.S. Appl. No. 11/015,423, dated May 18, 2011, (18 pages).
Office Action issued in U.S. Appl. No. 10/184,002, dated Apr. 20, 2006, (15 pages).
Office Action issued in U.S. Appl. No. 10/184,002, dated Aug. 25, 2005, (13 pages).
Office Action issued in U.S. Appl. No. 10/184,002, dated Jan. 8, 2008, (10 pages).
Office Action issued in U.S. Appl. No. 10/334,056, dated Oct. 30, 2008, (19 pages).
Office Action issued in U.S. Appl. No. 10/633,636, dated May 25, 2010, (10 pages).
Office Action issued in U.S. Appl. No. 11/015,424, dated Mar. 19, 2008, (31 pages).
Final Office Action issued in U.S. Appl. No. 11/015,476, dated Sep. 8, 2009, (14 pages).
Office Action issued in U.S. Appl. No. 11/017,204, dated Jun. 23, 2008, (33 pages).
Office Action issued in U.S. Appl. No. 11/079,522, dated Sep. 1, 2009 (8 pages).
Office Action issued in U.S. Appl. No. 12/336,880, dated Aug. 4, 2010 (12 pages).
PowWow, Mar. 1, 2000, Introduction, retrieved on Apr. 3, 2006 from http://web.archive.org/web/20000301125635/ww2.tribal.com/help/online_ docs/h205voic.html (2 pages).
Pruitt, IDG News Service: "Morpheus Updates Peer-to-Peer Client," Jun. 10, 2002, retrieved on Feb. 14, 2007 from URL:http://www.pcworld.com/article/id.101736/article.html (3 pages).
Movva et al., "MSN Messenger Service 1.0 Protocol," Aug. 1999, Internet Draft, http://tools.ietf.org/id/draft-movva-msn-messenger-protocol-oo.txt, 28 pages.
Ranganalhan et al., "ConChat: A Context-Aware Chat Program," 2002, Pervasive Computing, pp. 51-57.
Satter, excerpts from Internet TV with CU-SeeMe, First Edition, including Title Page and Copyright Page; "Overview;" "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; Sams. net Publishing, Indianapolis, IN.
Snider, "America goes online for New Year's bash," USA Today, Jan. 2, 2000, 1 page.
Stanek, Microsoft Windows 2000 Administrator's Pocket Consultant, Microsoft Corporation, 1999, retrieved from http://www.microsoft.-com/technet/prodtechnol/ad/windows2000/evaluate/05w2kada.asp on May 8, 2003, pp. 1-6.
Stanek, Microsoft Windows 2000 Administrator's Pocket Consultant, Microsoft Corporation, 1999, retrieved from http://www.microsoft.com/technet/prodtechnol/ad/windows2000/evaluate/05w2kadb.asp? n May 8, 2003, pp. 1-10.
Drucker et al, "Support Vector Machines for Spam Categorization," IEEE Transactions on Neural Networks, vol. 10, No. 5, Sep. 1999, pp. 1048-1054.
Leiber, "SWF Seeks Attractive Head Shot; To Stand Out, Online Daters Pay for Professional Photos; Cropping out the Ex-Wife," Nov. 19, 2003, The Wall Street Journal, (1 page).
Transcript of Oral Proceedings, held Dec. 9, 2009, for U.S. Appl. No. 10/633,636 (14 pages).
Transcript of Oral Proceedings, held Mar. 10, 2010, for U.S. Appl. No. 10/146,814 (16 pages).
Tribal Voice, PowWow Guided Tour—Step 6, PowWow personal communication. http://web.archive.org/web/2000817094516/www.tribal.com/powwow/tour/step6.cfm, Oct. 22, 1999 (2 pages).
Viegas et al., "Digital Artifacts for Remembering and Storytelling: PostHistory and Social Network Fragments," retrieved from http://web.media.mit.edu/~fviegas/papers/posthistory_snf.pdf (10 pages).
"Windows NetMeeting—Features," retrieved from http://www.microsoft.com/windows/NetMeeting/Features/default.ASP on Jun. 17, 1999 (8 pages).
Wayner, "Hey Baby, Call Me at My IP Address," Apr. 1996, pp. 142-144.
WBWE (1998), PowWow 3.6 Brings the Power of Internet Community to the People, Business Wire, (2 pages).
Yoshino, et al., "Namba: Location-Aware Collaboration System for Shopping and Meeting," Aug. 2002, IEEE Transactions on Consumer Electronics, pp. 470-477.
Wang et al., "Video: An empirical study of realvideo performance across the internet," Proceedings of the 1st ACM SIGCOMM Workshop on Internet Measurement IMW'01. Nov. 2001. ACM Press (15 pages).

* cited by examiner

USER

| Degrees of Separation | User | Whom Connected To |
|---|---|---|
| 2 | User5 | User4 |
| 1 | User4 | User1 |
| 1 | User3 | User2 |
| 0 | User2 | User |
| 0 | User1 | User |

SYSTEMS AND METHODS FOR DETERMINING THE POPULARITY OF A USER BASED ON AGGREGATED POPULARITY MEASUREMENTS OF OTHER USERS

CROSS-REFERENCE TO RELATED APPLICATIONS

This application is a continuation of and claims the benefit of priority to U.S. patent application Ser. No. 11/464,816, now U.S. Pat. No. 9,742,615, filed Aug. 15, 2006, which claims priority under 35 U.S.C. § 119 to U.S. Patent Application No. 60/707,965, filed on Aug. 15, 2005, and entitled "Popularity Index," and U.S. Patent Application No. 60/807,688, filed on Jul. 18, 2006, and entitled "Popularity Index," the entireties of each of which are incorporated herein by reference. This application also claims the benefit of U.S. patent application Ser. No. 11/079,522, filed on Mar. 15, 2005 and entitled "Sharing Social Network Information," and U.S. patent application Ser. No. 10/334,056, filed on Dec. 31, 2002 and entitled "Notification of Contact List Membership and Statistics," the entirety of each of which are incorporated in their entirety herein.

TECHNICAL FIELD

This document relates to social networks.

BACKGROUND

Entities who use online communications services, and who may not have a direct relationship to one another, may nevertheless be linked to one another through intermediary entities based on a personal, business, or other relationship among the entities and the intermediary entities. For example, a user A may have a friend, user B, who also uses the communications services and who has a business relationship with user C who uses the communications services. Thus, user A is linked to user C through user B. Such interpersonal interactions or relationships may generally be referred to as a social network. How many intermediary entities are needed to link one entity or user to another may generally be referred to as the degrees of separation between those two entities or users.

SUMMARY

In one general aspect, a method for determining a popularity of an online identity includes identifying an online identity for which a popularity measurement is to be determined and identifying one or more other online identities based, at least in part, on their being within a specified number of degrees of separation of the online identity. Popularity measurements for the other online identities are accessed and aggregated. A popularity measurement for the online identity is determined based on at least the aggregated popularity measurements for the other online identities.

Implementations may include one or more of the following features. For example, one or more other online identities may be identified based on their being within the specified number of degrees of separation from the online identity and on their having established a relationship with the online identity. Identifying one or more other online identities that have established a relationship with the online identity may include identifying at least one other online identity based on their having listed the online identity in a contact list.

Identifying one or more other online identities that have established a relationship with the online identity may include identifying at least one other online identity based on their having listed an intermediate online identity through which the other online identity is related to the online identity in a contact list.

Aggregating the popularity measurements of the other online identities and determining the popularity measurement for the online identity may include determining, for each of the other online identities, whether the other online identity was manually or automatically related to the online identity; and for each of the other online identities, determining whether to include the popularity measurement of the other online identity when determining the popularity measurement of the online identity based on whether the other online identity was manually or automatically related to the online identity. Determining whether to include the popularity measurement of the other online identity in the popularity measurement of the online identity based on whether the other online identity was manually or automatically related to the online identity may include including a greater contribution of the popularity measurement of the other online identity in the popularity measurement of the online identity when the other online identity was manually related to the online identity than when the other online identity was automatically related to the online identity. Determining whether the other online identity was manually or automatically related to the online identity may include determining whether an identifier of the online identity was manually or automatically added to a contact list associated with the other online identity or with an intermediate online identity through which the online identity and the other online identity are related.

Identifying one or more other online identities may include identifying one or more other online identities based on their being within a specified number of degrees of separation of the online identity and on their being online when the online identity is identified. The method may include determining that one of the other online identities has transitioned to an offline state, and removing a contribution of the popularity measurement of the other online identity from the popularity measurement of the online identity. The method may include identifying another online identity within the particular degree of separation from the online identity that is online; and accessing a popularity measurement of the another online identity; and adding the popularity measurement of the another online identity to the popularity measurement of the online identity.

Aggregating the popularity measurements of the other online identities into the popularity measurement for the online identity may include determining, for each of the other online identities, a degree of separation between the other online identity and the online identity; and including, for each of the other online identities, the popularity measurement of the other online identity in the popularity measurement of the online identity based on the determined degree of separation.

Aggregating the popularity measurements of the other online identities into the popularity measurement for the online identity may include determining, for each of the other online identities, a number of electronic messages sent between the other online identity and at least the online identity; and including, for each of the other online identities, the popularity measurement of the online identity in the popularity measurement of the online identity based on the determined number of messages.

Aggregating the popularity measurements of the other online identifies into the popularity measurement for the online identity may include determining, for each of the other online identities, a frequency of electronic message exchange between the other online identity and at least the online identity; and including, for each of the other online identities, the popularity measurement of the online identity in the popularity measurement of the online identity based on the determined frequency of electronic message exchange.

Online behavior of the online identity may be controlled based on the popularity measurement of the online identity. Online behavior of the online identity may be controlled in a manner in which the online identity may send and receive electronic messages. Online behavior of the online identity may be controlled by specifying a level of access to a resource that is provided to the online identity.

An indication of the popularity measurement of the online identity may be presented, and may include presenting an explanation of the popularity measurement of the online identity.

The popularity measurement of the online identity may be compared to one or more thresholds.

A value for an online identity attribute may be identified based on comparison results of the popularity measurement of the online identity to the one or more thresholds.

In another general aspect, a method for comparing popularities of multiple online identities includes receiving an indication of a first online identity and an indication of a second online identity. A popularity of the first online identity and a popularity of the second online identity are accessed, and the popularity of the first online identity is compared to the popularity of the second online identity. An indication of whether the popularity of the first online identity exceeds the popularity of the second online identity is provided based on results of the comparison between the popularity of the first online identity and the popularity of the second online identity.

Implementations may include one or more of the following features. For example, providing an indication of whether the popularity of the first online identity exceeds the popularity of the second online identity may include presenting an indication of whether the popularity of the first online identity exceeds the popularity of the second online identity. Presenting an indication of whether the popularity of the first online identity exceeds the popularity of the second online identity may include presenting an indication of the popularity of the first online identity, and/or presenting an indication of the popularity of the second online identity. Presenting an indication of whether the popularity of the first online identity exceeds the popularity of the second online identity may include prominently presenting an identifier of the first online identity relative to an identifier of the second online identity when the popularity of the first online identity exceeds the popularity of the second online identity; and prominently presenting an identifier of the second online identity relative to an identifier of the first online identity when the popularity of the second online identity exceeds the popularity of the first online identity.

Prominently presenting an identifier of the first online identity relative to an identifier of the second online identity may include presenting only an identifier of the first online identity, and prominently presenting an identifier of the second online identity relative to an identifier of the first online identity comprises presenting only an identifier of the second online identity.

Presenting an indication of whether the popularity of the first online identity exceeds the popularity of the second online identity may include presenting a visual indication of whether the popularity of the first online identity exceeds the popularity of the second online identity.

Presenting an indication of whether the popularity of the first online identity exceeds the popularity of the second online identity may include presenting an audible indication of whether the popularity of the first online identity exceeds the popularity of the second online identity.

Accessing a popularity of the first online identity may include identifying one or more other online identities based, at least in part, on their being within a specified number of degrees of separation of the first online identity. Popularity measurements of the other online identities may be accessed and aggregated. A popularity measurement for the first online identity may be determined based on at least the aggregated popularity measurements of the other online identities.

Accessing a popularity of the second online identity may include identifying one or more other online identities based, at least in part, on their being within a specified number of degrees of separation of the second online identity. Popularity measurements of the other online identities may be accessed and aggregated. A popularity measurement for the second online identity may be determined based on at least the aggregated popularity measurements of the other online identities.

In another general aspect, a computer readable medium includes instructions for generating a graphical user interface for enabling a determination of a more popular online identity of two online identities. The generated graphical user interface includes a first identifier specification mechanism that enables specification of an identifier of a first online identity, a second identifier specification mechanism that enables specification of an identifier of a second online identity; and a display of an indication of whether a popularity of the first online identity exceeds a popularity of the second online identity.

Implementations of this aspect may include one or more of the following features. For example, the computer readable medium may include a selection mechanism that, when selected, causes a determination of whether the popularity of the first online identity exceeds the popularity of the second online identity.

The display may include a display of an indication of the popularity of the first online identity; and/or a display of an indication of the popularity of the second online identity.

The display may include a display of results of a comparison between the popularity of the first online identity and the popularity of the second online identity.

These general and specific aspects may be implemented using a system, a method, or a computer program, or any combination of systems, methods, and computer programs.

Other features will be apparent from the description and drawings, and from the claims.

DETAILED DESCRIPTION

A popularity index may be calculated for a user based on several factors, including the number of other users directly or indirectly linked to the user, distances between the user and the other users, popularity of the other users, and the number of instant messages sent by the user. Users with high popularity indices may be granted more permissions or privileges and may be given a higher status.

A social network may be established by evaluating contact lists of members of the social network. Additionally or alternatively, the social network may be established by sending invitations to establish relationships in the social network to members or potential members of the social network, who then accept the invitations. Direct relationships within the social network may be categorized. For example, a relationship between a first member and a second member of the social network may be categorized as a vendor relationship, which indicates that the first member is a vendor of the second member Categories for the relationships may be established from the contact lists that were evaluated to create the social network. Additionally or alternatively, the categories may be indicated in the invitations or the acceptances of the invitations that were sent to create the social network.

Categorizing the direct relationships within the social network enables searching over the categories of the direct relationships to identify particular members of the social network. For example, vendors may be identified within the social network by identifying members of the social network involved in direct relationships that have been categorized as vendor relationships. The identified members may be sorted such that the identified members that are a smaller number of degrees of separation away from a searching member or are involved in a larger number of vendor relationships are presented before the identified members that are a larger number of degrees of separation away from the searching member. A particular type of member may be searched for in a member directory that includes the members of the social network. Members from the social network that are involved in relationships that match the particular type may be displayed before other members included in the member directory that match the particular type.

Figure 1:
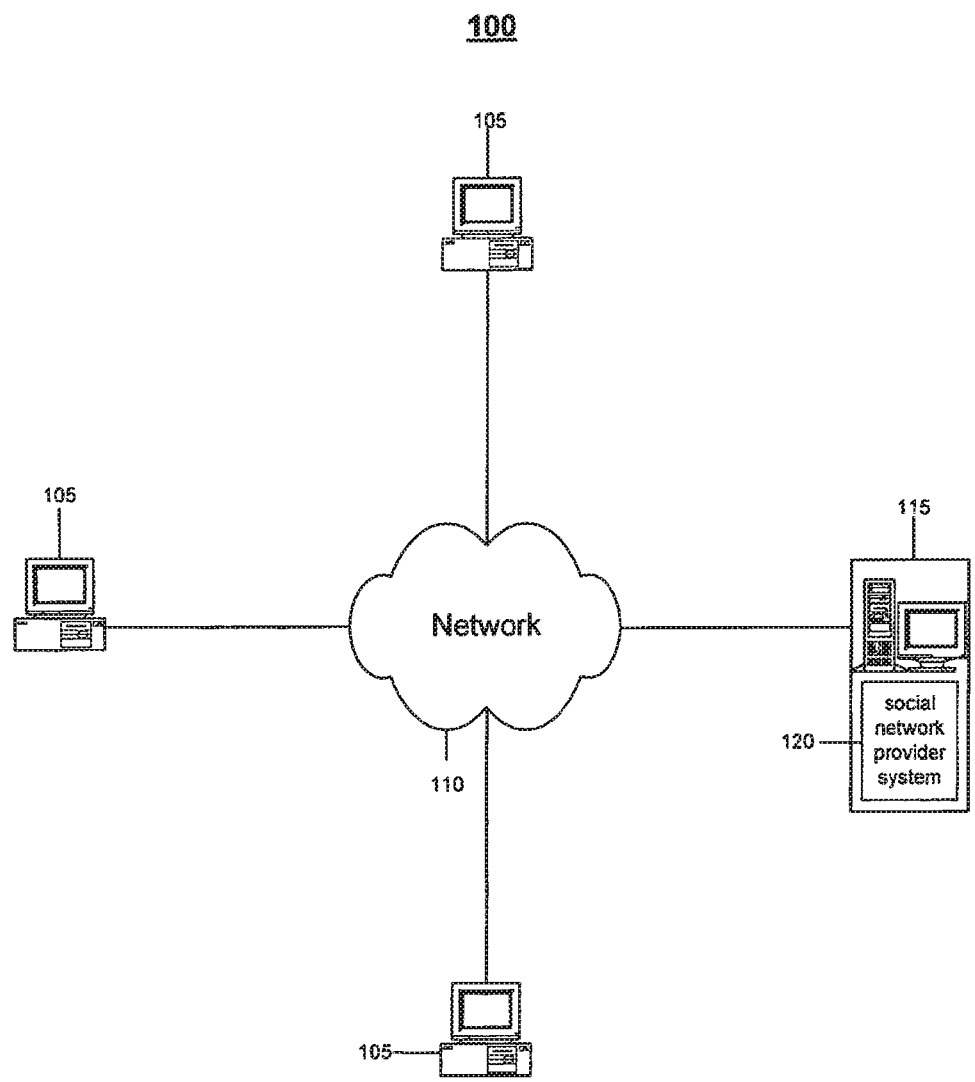
FIG. 1 is a block diagram of an exemplary networked computing environment.

Referring to FIG. 1, an exemplary networked computing environment 100 supports communications between computer users. The computer users may be members of a social network of users of the networked computer environment 100. The computer users are distributed geographically and communicate using client systems 105. A network 110 interconnects the client systems 105. The client systems 105 are connected to the network 110 through various communication channels, such as a modem connected to a telephone line (using, for example, serial line Internet protocol (SLIP) or point-to-point protocol (PPP)) or a direct inter-network connection (using, for example, transmission control protocol/internet protocol (TCP/IP)).

The client systems 105 include a communications interface (not shown) used by the communications programs to send communications through network 110. The communications may include for example, e-mail, audio data, video data, general binary data, or text data (e.g., encoded in American Standard Code for Information Interchange (ASCII) format). The client systems 105 also may include one or more input devices, such as a keyboard, a mouse, a stylus, a camera, or a microphone, as well as one or more output devices, such as a monitor, a touch screen, speakers, or a printer.

The network 110 typically includes a series of portals interconnected through a coherent system. Examples of the network 110 include the Internet, Wide Area Networks (WANs), Local Area Networks (LANs), analog or digital wired and wireless telephone networks (e.g., a Public Switched Telephone Network (PSTN), an Integrated Services Digital. Network (ISDN), or a Digital Subscriber Line (xDSL)), or any other wired or wireless network. The network 110 may include multiple networks or subnetworks, each of which may include, for example, a wired or wireless data pathway.

A host server 115 also may be connected to the network 110 and may be used to facilitate some direct or indirect communications between the client systems 105. For example, the host server 115 may include a social network provider system 120 that maintains the social network of the users of the networked computing environment 100. To maintain the social network, the social network provider system 120 maintains lists of the users of the networked computing environment 100 and of the relationships between the users. In addition, the social network provider system 120 may enable searching over the users and the relationships between the users. In addition, the social network provider system 120 may maintain information related to the users or the relationships between the users, such as profiles of the users or categories for the relationships.

Each of the client systems 105 and the host server 115 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 105 and the host server 115 may receive instructions from, for example, a software application, a program, a piece of code, a device, a computer, a computer system, or a combination thereof, which independently or collectively direct operations, as described herein. These instructions may take the form of one or more communications programs that facilitate communications between the users of the client systems 105. For instance, such communications programs may include e-mail programs, instant messaging (IM) programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 105 or the host server 115.

Further, the host server 115 includes a communications interface (not shown) used by the communications programs to send communications through network 110. The communications may include, for example, e-mail, audio data, video data, general binary data, or text data (e.g., encoded in American Standard Code for Information Interchange (ASCII) format).

The social network information may be shared across online service providers. Thus, one online service provider M that maintains a membership separate from a second online service provider N may nevertheless use the social network maintained by the second online service provider N to tailor content and/or services based on such social network information. Generally, the terms "member," "user," and "entity" are used interchangeably throughout this description. These terms, however, should not be seen as limited to a person. For example, an organization, such as a corporation, also may use the services provided by an online service provider. Consequently, these terms should be seen as encompassing any entity, actual, legal, or otherwise, that uses a service provider network.

In general, entities may be members of an online service provider. The online service provider may maintain a network that provides its members with content and/or one or more communication services, such as chat, instant messaging (IM), e-mail, message boards, and member directories. An entity may use a client application to connect to the online service provider's network through a global network such as the Internet and to logon to the online service provider's network by providing a screenname (otherwise referred to as a username) and password that have previously been established with the online service provider. Once the entity is authenticated, the client application may be used by the entity to access the content and communication services provided by the online service provider's network. The communication services may allow the entity to communicate with other members of the online service provider. The online service provider may provide access to different communications services depending on a level of access granted to the entity and/or based on the client application used by the entity to connect to the online service provider's network.

America Online, Inc. of Dulles, Va. is an example of an online service provider that maintains an online service provider network. America Online® allows entities who subscribe to the America Online® service to connect to the America Online® network using the AOL® client application. These entities are then able to access the proprietary content and communication services provided by the America Online® network. Some of the content and communication services (for example, message boards) are only available to entities who subscribe to the America Online® service and who connect to the America Online® network using the AOL® client application. America Online® also provides instant messaging services to entities, regardless of whether they subscribe to the America Online® service, through the AOL instant messaging (AIM®) client application. An entity may use the AIM® client application to connect to the America Online® network and to use the instant messaging services provided by the America Online® network. More generally, an online service provider network refers to one or more servers that provide some online service or content that users register to use or view.

Members of an online service provider may use the online service to maintain user contact lists (e.g., address books or instant messaging contact lists). For example, the AIM® client application allows a user to maintain a contact list (referred to as a Buddy List®) that includes the screennames of the entities to whom the user of the AIM® client desires to send instant messages.

Such contact lists may be evaluated to determine the links and the degrees of separation between two entities. For example, entity A may list entity B in entity A's instant messaging contact list, entity B may list entity C in entity B's instant messaging contact list, and entity C may list entity D in entity C's instant messaging contact list. Here, entity B is zero degrees of separation away from A (that is, there are no intermediate nodes between them). Entity C is one degree of separation away from A (they are separated by B). Entity D is two degrees of separation away from A (they are linked via entities B and C).

The online service provider may automatically map a first entity's social network (e.g., the entire social network or up to a designated number of degrees of separation), for example, by evaluating the first entity's contact list(s) and then successively evaluating the contact list(s) of those entities listed in the first entity's contact list until the desired number of degrees have been reached or until the entire network has been mapped. For example, entity A may list entities B and C in entity A's instant messaging contact list. A system may evaluate and determine that entities B and C are so listed and construct a social network map that indicates that entities B and C are linked to entity A. The online service provider may then evaluate the contact lists of entities B and C to determine the entities to which entities B and C are linked. For example, the system may determine that entity B's instant messaging contact list includes entities D and E, and, consequently, that B is linked to D and E. The system then may refine the social network map to indicate that A is linked directly to B and C and is also linked to D and E through B. The online service provider may additionally or alternatively use other techniques to map a social network. For example, the online service provider may observe which users communicate with one another and/or may ask the users to explicitly create their networks The online service provider may store such information about its members as a social network map, graph, or list. The online service provider may make such social network information available to third party service provider networks (i.e., networks of one or more servers that provide content or services separate from those provided by the online service provider, such as, for example, a web server that is separate from the online service provider's network).

For example, in one implementation, a client system may execute a social network client application that logs into the online service provider's network. The client system also may execute a web browser that requests a web page from a third party web server. The web page may include social network display code. The social network display code may communicate with the social network client application to request social network information regarding the user of the client system. The social network client application then may use an application programming interface to retrieve social network information for the user of the client system from a social network server on the online service provider network. The social network client application then returns the social network information to the social network display code of the web page, which modifies the web page based on the social network information. Thus, the web page, for example, can be modified based upon the social network relationship between the viewer of the web page and the creator of content in the web page, or the user corresponding to contact information displayed in the web page content.

For instance, if the web page provides newsgroup posts, or other content that is added by users of the website, the social network display code may change the order of the posts based on the social network information. The social network display code may, for instance, move posts added by the users in the client system user's social network to the top of the web page and/or may order them based on the number of degrees of separation between the user who added the post and the client system user. The social network code may alternatively or additionally order the posts based on the posting user's reputation in the social network of the client system user. Ordering or otherwise changing the position of added content on a web page based on the social network information may, for example, help alleviate problems related to spam content or posts. As another example, a visual cue may be displayed to an entity viewing contact or other information displayed on a web page to represent another entity. The visual cue may directly indicate the degrees of separation between the entity whose contact information is displayed and the entity who is viewing the contact information, may display the pathway between the two, and/or indicate reputation information. For example, if a potential buyer A is reading a post by a seller B (where the post displays seller B's contact information) on an online auction site (such as the online auction provided by eBay Inc. of San Jose, Calif.), and buyer A is linked to seller B by six degrees of separation, then a visual cue may be displayed in association with seller B's contact information to indicate to buyer A that entities A and B are linked and separated by six degrees of separation. The visual cue may alternatively or additionally indicate whether members of user A's social network have marked user B with a positive or negative reputation.

Similarly, if a job hunter A is reading a post by an employer B (where the past displays entity B's contact information) on an employment website, and the job hunter A and employer B are separated by three degrees of separation, a visual cue may indicate that they are separated by three degrees and may additionally or alternatively indicate the path between the two. Providing such information may make a buyer more comfortable buying from the seller, in the case of an online auction, or, in the case of the employment website, may provide information about contacts that can be leveraged by the job hunter to obtain employment with the employer or help the employer determine whether to hire the job seeker.

Referring to FIG. 1, social network information is maintained in an exemplary networked computing environment 100 by the online service provider network 120. The online service provider network 120 may be made available to modify the content and/or services provided by the network 110. The network 110 may be interconnected with one or more third party online service provider networks. Accordingly, the computing environment 100 may include one or more client systems 105, service provider network 120, and third party service provider networks interconnected by the network 110, such as the Internet.

The service provider network 120 may be one like the network provided by America Online®. However, as described above, an online service provider network more generally refers to one or more servers that provide some online service or content that users register to use or view. For example, social network websites, such as the ones provided by Tribe Networks, Inc. of San Francisco, Calif. (located at www.tribe.net) and LinkedIn Corporation of Palo Alto, Calif. (located at www.linkedin.com), may be referred to as online service provider networks. Users register with these websites to obtain a username and password, which the users then use to log onto these websites to access the social network services provided by these websites. As another example, some websites (such as web logs or websites that provide access to newsgroups or forums) allow users to post comments or other content. Before such websites allow users to post content, the websites typically require users to register with the website to obtain credentials, such as a username and password, which the user then uses to log into the website and post content.

The service provider network 120 may includes a login server that allows a client application to log into service provider network 120 using, for example, a screenname and password. The screenname or username used to log into service provider network 120 is referred to as a service provider username. Once the client application is authenticated and logged into the service provider network by login server, the client application can then access some or all of the services or content provided by service provider network 120. The service provider network 120 may also include a social network server that determines the social network map(s) or list(s) for members of online service provider network 120 and makes such social network information available for use in modifying a third party provider's content or services.

The social network client applications may be client applications, such as an instant messaging client or an online service provider client like the AOL® client, used by users to access services or content provided by the service provider network 120. Alternatively, social network client applications may be applications that simply act as intermediaries to obtain the social network information. Social network client applications 134a and 134b may be plug-ins for web browsers or other applications, or they may be stand-alone applications or services on client systems that may or may not have a user interface.

From the standpoint of the online service provider network 120, network 110 may be a third party service provider network (i.e., it provides content and/or services that are not part of service provider network 120). Third party service provider networks may provide a web server and, in addition or as an alternative to a web server, include other types of servers that provide content or services, which may or may not be accessed by client applications other than web browsers. For example, the third party service provider network 110 may include an e-mail server that provides e-mail service that is accessed by an e-mail client, or an instant messaging server that provides instant messaging service to an instant messaging client. The third party online service provider network 110 may be a network similar to the AOL® network. Third party online service provider 110 may maintain its own social network for the members of third party service provider network 110.

Each of the client systems 105 and host server 115 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 105 and any networked servers may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to client systems or servers. Network 110 may include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Network 150 may include multiple networks or subnetworks, each of which may include, for example, a wired or wireless data pathway.

Figure 2A:
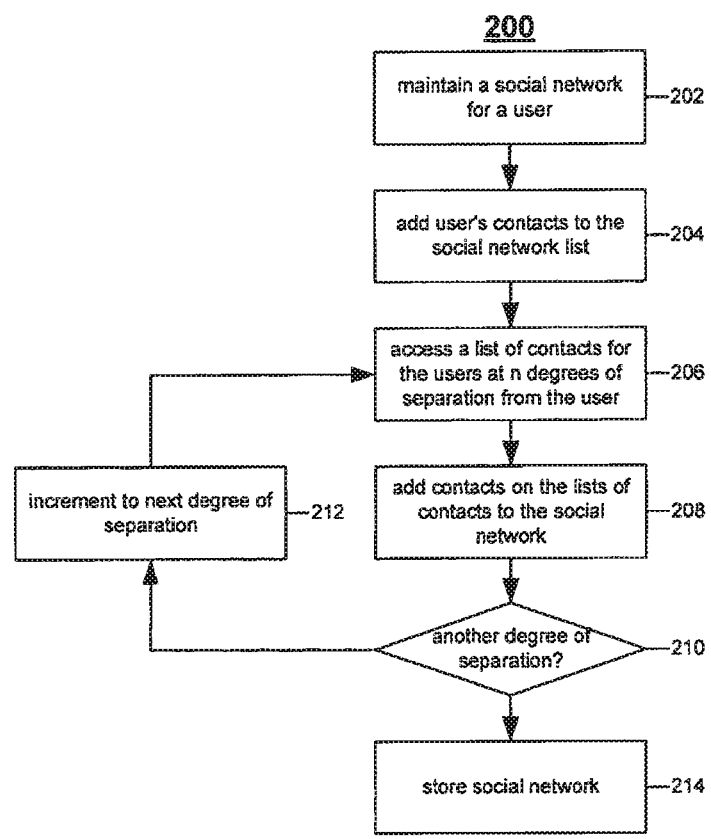
FIG. 2A is a flowchart showing a process for determining a user's social network.

FIG. 2A is a flow chart showing a process 200, which may be performed, for example, by a social network server, to determine a user's social network. A social network list is maintained for the user (202). The contacts in one or more of the user's contact lists (e.g., the user's instant messaging contact list) are added to the social network list with an indication that the contacts are zero degrees of separation from the user (and, therefore, are directly linked to the user) (204). Next, the contacts linked to the user through the user's contacts in the contact list (e.g., up to a desired degree of separation) are identified and added to the social network list. To do so, the contact lists of each contact in the user's contact list are accessed (206). The contacts in those lists (i.e., the contacts separated by one degree) then are added to the social network list (208). If another degree of separation is desired (210), the degree of separation is incremented (212) such that the contact lists of the contacts that are separated from the recipient by one degree are accessed (206) and the contacts in those contact lists are added to the social network list (208). When a contact is added to the social network list, the contact's degree of separation from the user also is added and, in addition, the contact that links the user to the added contact may be stored so that an indication can be provided of the path between the user and the added contact. The addition of contacts continues until the desired degree of separation is reached, at which point the social network list is stored for later use (214).

The above process can be modified in a number of ways. For example, at times it may be desirable to have greater assurance that a relationship actually exists between two users before indicating that the two users are directly linked. That is, before a first user is included in a social network, it may be desirable to have greater assurance that there is a relationship between the first user and a second user which connects the first user to the social network. In particular implementations, such assurance can be obtained by requiring that two entities list each other in their respective contact lists before the entities are considered as having a relationship (and, therefore, are directly linked). In such implementations, an increased likelihood of a relationship between two users is assumed to exist when the two users list each other in their respective contact lists. Thus, for example, before a second user listed in a first user's contact list is added to the first user's social network list, the second user's contact list may be accessed to determine if the first user is listed in the second user's contact list. If such a bidirectional link exists, then the second user is added to the first user's social network list. Rather than adding the contacts to the social network list, either automatically or manually (e.g., step 208), a counter can be incorporated that tallies the number of other users in each contact list and does not necessarily need to record the actual identity of each additional contact. For example, the number of remaining contacts recorded with a counter can be used to establish a user's popularity, without actually having to store numerous contacts and identities in a social network list.

The contact lists used to develop the social network list or otherwise used to map a social network may be stored centrally or in a distributed fashion. For example, the techniques may be applied to an environment in which all of the users' contact lists are stored on a single server (completely centralized), or on a single cluster of servers owned by the service provider (partially centralized/distributed). The contact lists may be stored in a more fully distributed fashion by being stored on each client system (i.e., each user's contact list is stored on the user's client system). The contact lists may then be accessed by a social network server when social network client application is logged into a service provider network and temporarily or permanently stored by the social network server to develop the social network lists.

Figure 2B:
FIG. 2B is a diagram showing an example of a social network list.
Figure 2C:
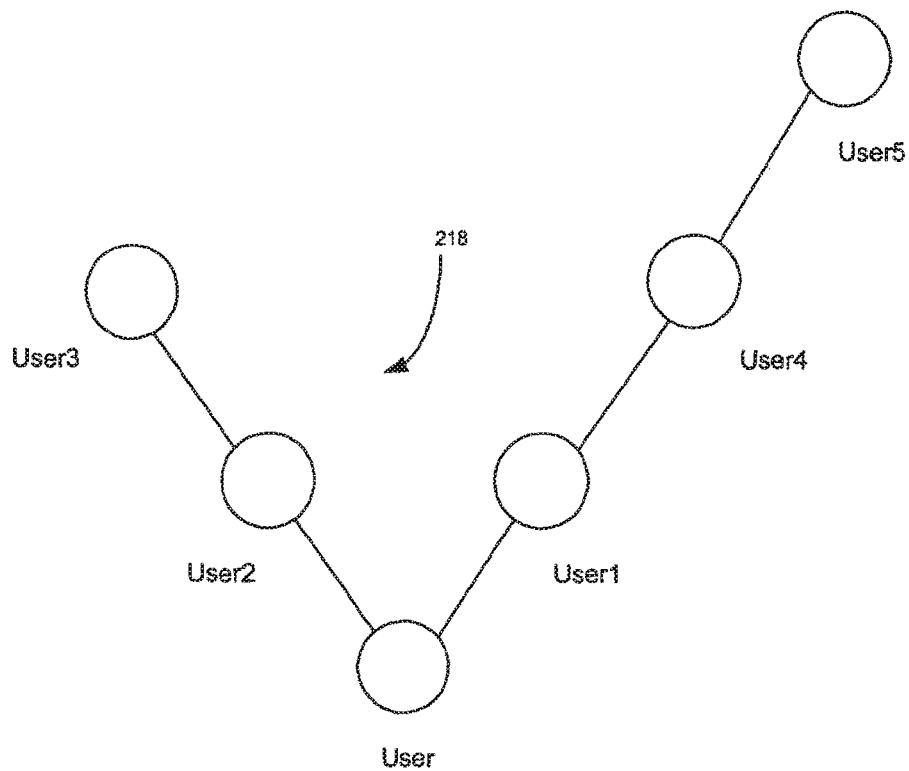
FIG. 2C is a diagram showing the social network corresponding to FIG. 2B in graphical form.

FIG. 2B shows an example of a social network list 216, while FIG. 2C shows the corresponding exemplary social network 218 in graphical form. Social network 218 is for an entity designated as User. User is directly linked to User1 and User2 (User may, for example, have User1 and User2 in User's address book). User1 is linked to User4, while User2 is linked to User3. Consequently, User is linked to User3 (through User2) and User4 (through User1) through one degree of separation. Similarly, User4 is linked to User5 and, consequently, User is linked to User5 (through User 4 and User1) through two degrees of separation.

Social network list 216 for User contains indications of the entities to which User is linked, the degrees of separation between User and the linked entities, and the entities linking the linked entity to the social network 218. For instance, an indication of User5 is included, along with an indication that User5 is two degrees of separation from User. There also is an indication that User4 is the entity that links User5 to social network 218 (and, hence, User). Including the entity linking a particular entity to the social network allows the structure of the social network to be determined from the social network list. As an alternative, the entity linking a particular entity to the social network may be excluded. For instance, the social network list may only contain an indication of the entity and its degrees of separation. The social network may alternatively or additionally contain more detailed information about the relationships between the users, such as the degree to which particular users trust or distrust other particular users and/or and indication of the strength of the links between users.

While the process described with respect to FIG. 2A determines existing social networks, from, for example, contact lists, other ways of forming, determining, or tracking social networks may alternatively or additionally be used. For instance, instead of determining existing social networks, the online service provider may provide tools to users so that they can positively create social networks for use with the social network websites described above. For instance, the online service provider may support an invite-accept model for forming social networks. In an invite-accept model, to become part of a social network, a user receives an invitation from another user to join the social network (i.e., to be linked to the other user). When the user accepts the invitation, he or she is linked to the other user, and hence, the social network. The online service provider then may use social network lists or other techniques to track the links between members of the various social networks.

An invite-accept model may be used in conjunction with the techniques described above for determining an existing social network using, for example, contact lists. For instance, the social network list may be constructed using contact lists as described above. Then, as the user receives and accepts invitations to join other social networks, the social network list may be updated to include those directly linked users that the user accepted, and the other users linked at further degrees of separation.

In some implementations, the online service provider may observe the communications between users to determine the social network, or to infer the strength of the links between users. For example, the online service provider may observe that two users communicate using instant messaging, and therefore are linked to one another. The online service provider then may observe the frequency of the users' communication to a determine the "strength" of the link between the two. Users' who communicate more frequently, for instance, may have a link with a higher strength than users that communicate less frequently.

As aforementioned, a popularity index may be calculated for a user based on several factors, including the number of other users directly or indirectly linked to the user, distances between the user and the other users, popularity of the other users, and the number of instant messages sent by the user. Users with high popularity indices may be granted more permissions or privileges and may be given a higher status.

Figure 3:
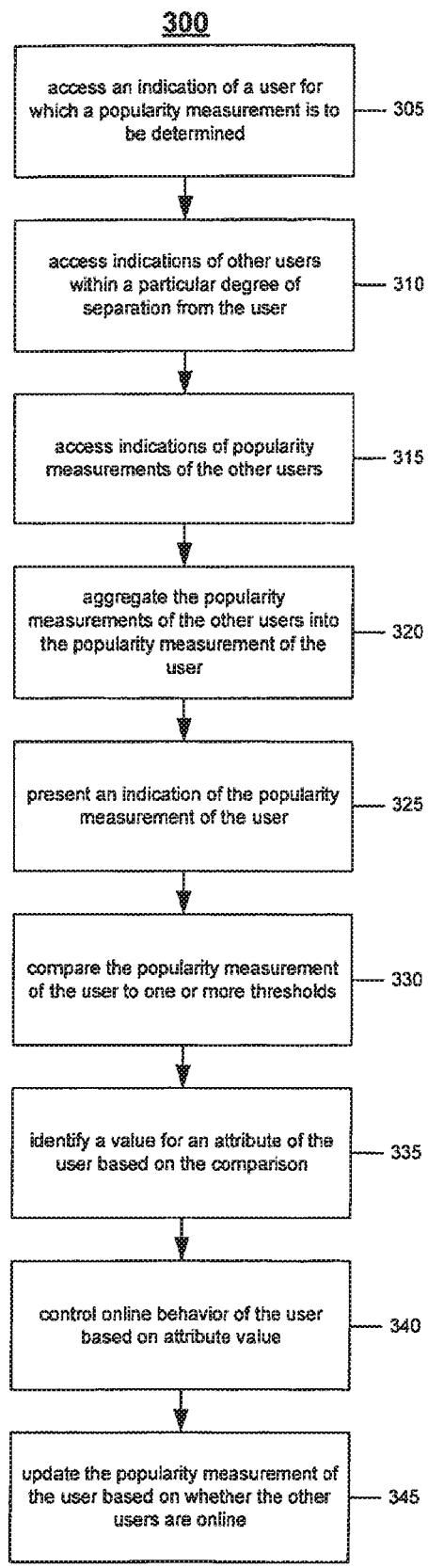
FIG. 3 is a flowchart of a process for determining a popularity measurement for a user or online identity.

FIG. 3 is a flowchart of a process 300, which may be performed, for example by, a social network provider system 120 or dedicated social network server, for determining a popularity measurement for a user or online identity. An indication of a user, such as a User's social network list, for which a popularity measurement is to be determined, is accessed by the system 120 (305). The indication of the user can be associated with, for example, a user's screenname within an instant messaging system which also includes an associated buddy or contact list. In addition, the user's screenname can be associated with various other user's and their respective social network lists, e.g., buddy lists.

Indications of other users within a particular degree of separation from the user, such as two degrees of separation (FIGS. 2B-2C), are accessed from the User's social network list (310). The degrees of separation is set to a predetermined value, such as two or three degrees of separation, although greater or lesser degrees of separation can be incorporated into the system to define the target group accessed from the User's social network list (310). Indications of popularity measurements for the other users may then be accessed (315) by the system 120, such as by accessing previously measured popularity indexes of the other users associated with the other users' social network lists. Alternatively, or in addition, the indications of the popularity measurements for the other users can be previously measured, concurrently calculated and/or periodically updated or recalculated for an accurate, real-time representation of other user's popularity measurements.

The popularity measurements of the other users are aggregated to establish the User's popularity measurement (320), and an indication of the popularity measurement of the User is presented to the User, such as through a numerical index, scaled rating system, and/or graphical symbol indicative of popularity measurement (325). The aggregation of the popularity measurements can include a simple summation of the popularity measurements of the other users, a weighted average or median value associated with other users, and/or may be dependent upon the other user's online or offline state, e.g., the popularity measurement of another user is weighted more favorably if the user is online.

The popularity measurement of the User may then be compared to one or more threshold values which define popularity rankings or attributes that may be defined in system 120 (330), and a value for an attribute of the User is identified based on the comparison (335). For example, the threshold values include a range of values, that permits a rounded or scaled result to be assigned to each popularity measurement. The system 120 optionally controls, either automatically or through offered incentives, online behavior of the User, such as by enhancing services or targeting content provided to the client system 105 of the User, based on the User's identified attribute value (340). The popularity measurement of the User may be updated based on the presence of the other users (345), e.g., the popularity measurement may assign weighted values to the User's popularity measurement based on the number of other users, the degrees of separation, and/or the online or offline state of the other users. In addition, the popularity measurement can be updated, e.g., to account for the removal of user's from a contact list or a change in another user's online state.

Figure 4A:
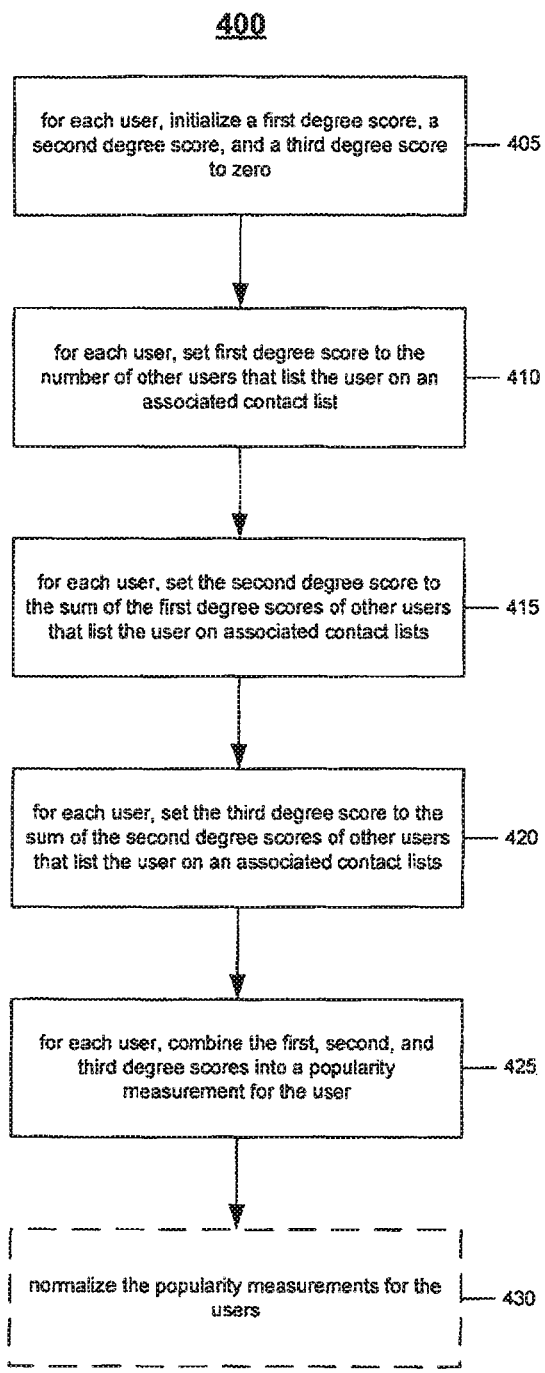
FIG. 4A is a flowchart of a process for determining a popularity measurement for one or more users based on degrees of separation from other online users.

FIG. 4A is a flowchart of an exemplary process 400 for determining a popularity measurement for one or more users based on degrees of separation from other online users. In process 400, a popularity measurement for a user is calculated based on the other users to whom the user is linked and the popularity of those other users. An iterative algorithm, which sums or determines an average (e.g., arithmetic mean average, median, or weighted average), is employed by the system 120 to identify popularity measurements of other users at progressively larger distances from the user. A first degree score (based on one degree of separation), a second degree score (based on a second degree of separation), and a third degree score (based on a third degree of separation) are each set to zero or some other setpoint, e.g., initialized (405). Although three degree scores are described, greater or lesser degrees of separation (and thus higher degreed scores) can be utilized in the process 400. The system 120 sets the first degree score for each user to the number of other users that list the user on an associated contact list (410), e.g., such as a buddy list. The system 120 sets the second degree score for each user to the sum of the first degree scores of other users that list the user on associated contact lists (415). The third degree score for each user are set to the sum of the second degree scores of other users that list the user on an associated contact list (420). After the desired degrees of separation (and associated scores) are iteratively determined, the first, second, and third degree scores for each user are combined into a popularity measurement for each user (425). In addition, or in the alternative, the summation of the first, second, and/or third degree scores for each user may include applying a weighted average to the various scores before summing, or even obtaining an overall arithmetic average or mean. For example, first degree scores may be weighted more heavily than second degree scores, and second degree scores weighted more heavily than third degree scores prior to determining the combined popularity measurement, e.g., by summing or averaging the various scores. The popularity measurement obtained for each user may then be normalized, e.g., assigned a ranking indicator based on the popularity measurement (430). However, the normalization of the popularity measurement is optional, and is not utilized if the actual popularity measurement for each user is expressed as a calculated, un-normalized result.

The iterative determination process is used to identify popularity indices first for other users directly related to the user, and then for other users indirectly related to the other user through increasing numbers of intermediate users, e.g., through three or more degrees of separation. The identified popularity indices are aggregated into a popularity index for the user. However, the amount or weight by which a popularity index of one of the other users contributes to the popularity index of the user may depend on the distance between the other user and the user, and on other factors pertaining to links between the users set in the system 120. For example, a popularity index may be affected based on whether the other user and the user were manually or automatically linked (e.g., if the other user was added to the user's buddy list as a recent buddy, the other user's popularity index may not contribute as much as it would if the user manually added the other user to his buddy list). The popularity index also may depend on messaging history and activity between users (e.g., the number of electronic messages sent by the user), or other attributes such as unilateral versus bilateral linking between users (e.g., whether both list each other, or whether only one lists the other.

Figure 4B:
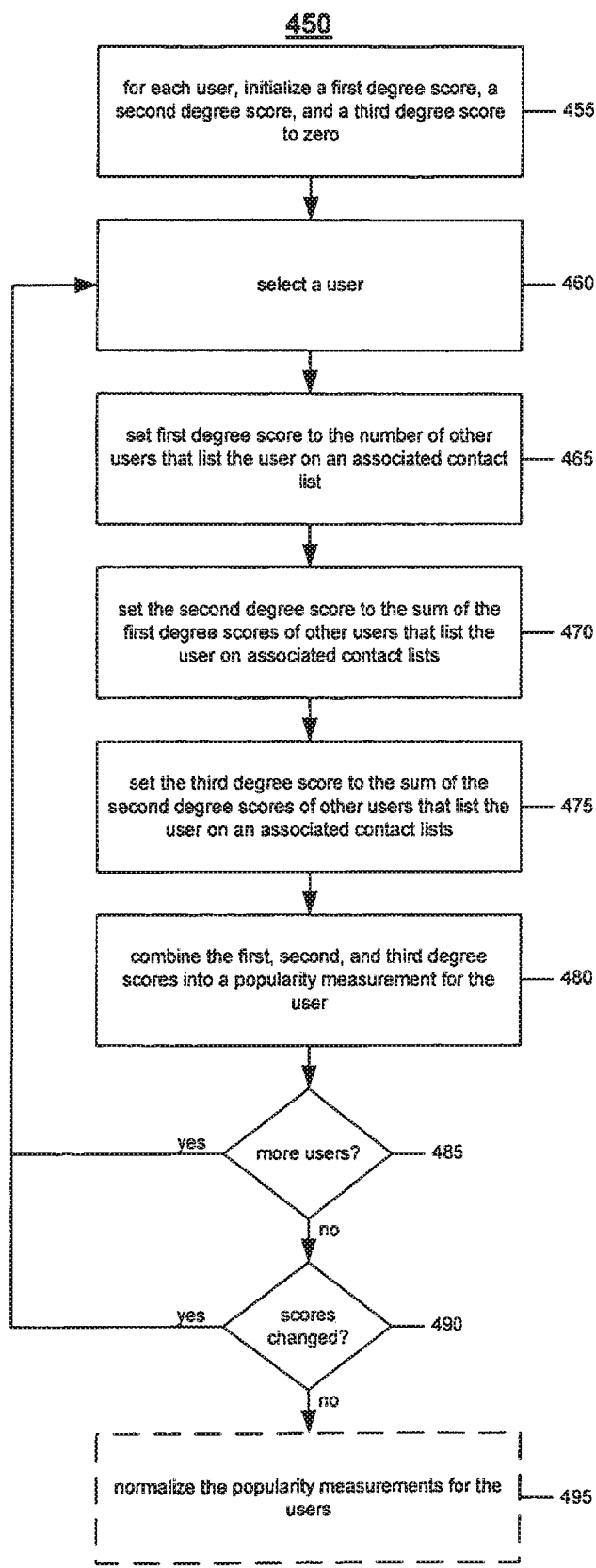
FIG. 4B is a flowchart of a process for determining an updated popularity measurement for one or more users based on degrees of separation from other online users.

FIG. 4B is a flowchart of an exemplary process 450 for determining an updated popularity measurement for one or more users based on degrees of separation from other online users. In process 450, each user's first degree score, second degree score, and third degree score is initialized (455). A user is selected (460), such as by the user requesting an updated score or through a comparative process selected by more than one user, and the selected user's first degree score (465), second degree score (470), and third degree score (475) are each set as described in connection with steps 410-420 of process 400. The first degree, second degree, and third degree scores are combined into a single popularity measurement for the user (480). In step 485, if additional users are selected for updating scoring (485), the process returns to step 460 for the next selected user. If there are no additional users selected, the process continues to determine if there has been any variation in the newly calculated score and the previously calculated score for the selected user(s) (490). The popularity measurements for the selected user, or each of the selected users, is optionally normalized (495).

Figure 4C:
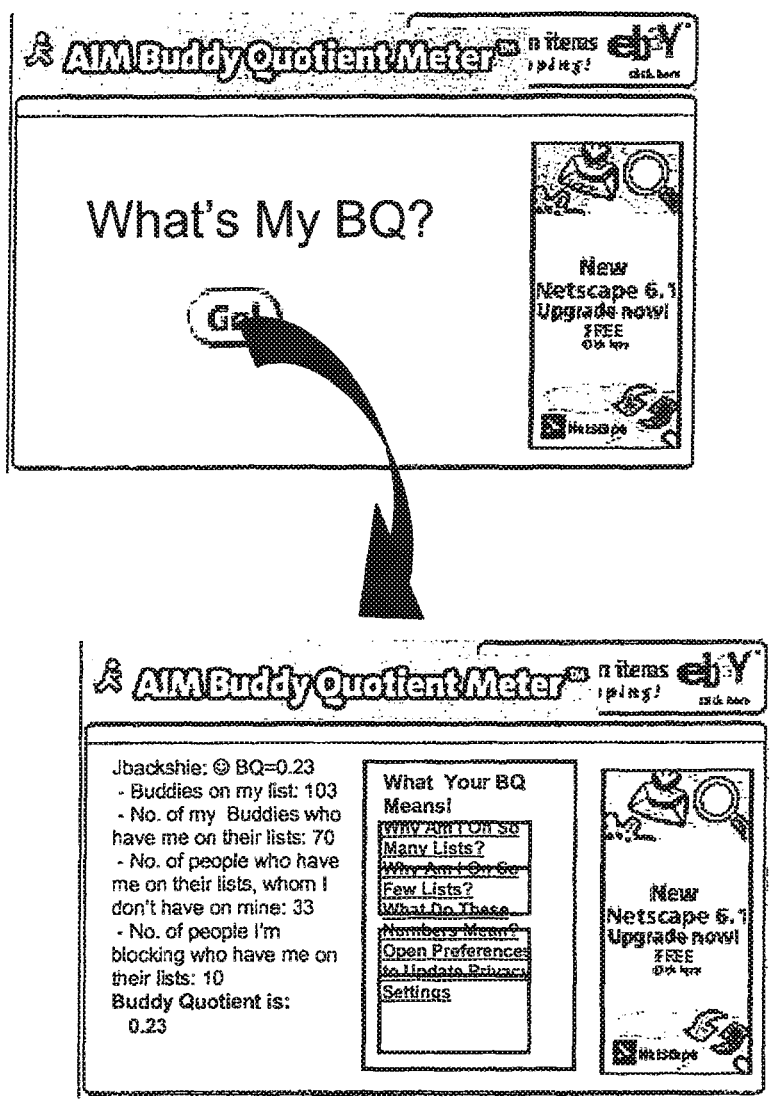
FIG. 4C is an exemplary screenshot showing a popularity measurement determined for a user.

FIGS. 4C-4G are exemplary screenshots collectively showing a popularity measurement determination process 450 as experienced by the user. Referring to FIG. 4C, a user interactively initiates a determination of their respective popularity measurement, or buddy quotient, which generates buddy quotient meter results. The buddy quotient results may include a screenname or other user identifier associated with a buddy quotient rating (BQ, e.g., 0.23). In addition, the user may be provided with explanations of one or more factor(s) related to the determination of the buddy quotient (BQ). For example, the buddy quotient results may include the number of contacts on your list, the number of contacts who have you on their lists, the number of users who have you on their lists, but may not be on the user's list, and/or the number of other users the user has blocked. In addition, or in the alternative, the buddy quotient results may include the number of buddy lists the average user is on for that specific time for that day of the week, and/or links to sub-pages explaining the results in greater detail, for example, Why Am I On So Many Lists? (FIG. 4D), Why Am I On So Few Lists? (FIG. 4E), What Do These Numbers Mean? (FIG. 4F), and/or a link the user's preferences screen (FIG. 4G) which provides the user with the convenience of adjusting privacy preferences responsive to the indicated buddy quotient rating (BQ).

Figure 4D:
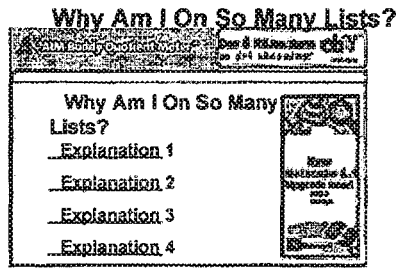
FIGS. 4D-4F are exemplary screenshots providing explanatory information relating to the user's popularity measurement and privacy.

FIGS. 4D-4G are exemplary screenshots providing explanatory information relating to the user's popularity measurement and privacy. In FIG. 4D, the user is provided with explanations of "Why Am I On So Many Lists?." For example, explanations 1-4 provided to the user may include one or more of the following descriptions shown in TABLE I.

TABLE I

WHY AM I ON SO MANY LISTS?

Explanation 1: Even users you've blocked can still have you on their list, you have a screen name that is easily mistaken by others.
Explanation 2: You've used this screen name in chat rooms.
Explanation 3: You've joined an Meet New People list and there are others who share your interest.
Explanation 4: You can't stop users from putting you on their Buddy List, but you can block anyone from seeing when you're online.

Figure 4E:
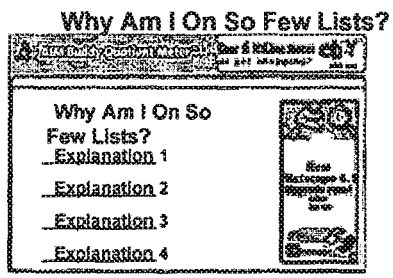

In FIG. 4E, the user is provided with explanations of "Why Am I On So Few Lists?" For example, explanations 1-3 provided to the user may include one or more of the following descriptions shown in TABLE II.

TABLE II

WHY AM I ON SO FEW LISTS?

Explanation 1: You're new to IM and don't know a lot of other users.
Explanation 2: You've blocked large amounts of users and they've taken you off their lists.
Explanation 3: These results include only online users.

Figure 4F:
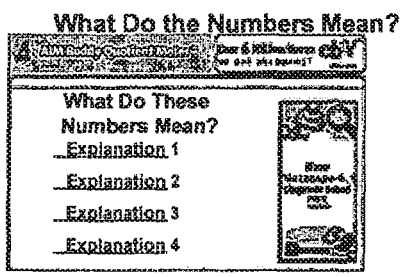

In FIG. 4F, the user is provided with explanations of "What Do These Numbers Mean?" For example, explanations 1-4 provided to the user may include one or more of the following descriptions shown in TABLE III.

TABLE III

WHAT DO THESE NUMBERS MEAN?

Explanation 1: Number of Buddies on your list
Explanation 2: Number of Buddies who have you on their lists
Explanation 3: Number of users who have you on their lists, but whom you don't have on your list.
Explanation 4: Number of users you've blocked but still have you on their lists.

Figure 4G:
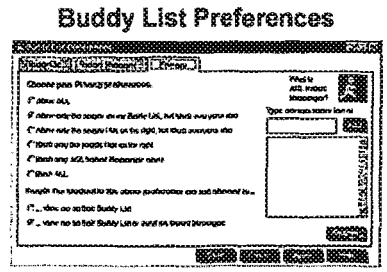
FIG. 4G is an exemplary screenshot showing user preferences for controlling a user's privacy preferences.

Referring to FIG. 4G, an exemplary screenshot showing user preferences for controlling a user's privacy preferences. In response to viewing a user's buddy quotient (BQ), the user may desire to adjust their privacy or other buddy list preferences to increase or decrease the user's availability to other users. The buddy list preferences permit the user to selectively adjust various settings, such as blocking or unblocking particular users access. For example, in one implementation, the popularity index of a user depends only on the popularity indices of other users linked to the user that are online at a time when the popularity index of the user is calculated. When one of the other users drops offline, the popularity index of the user may be decremented appropriately. The popularity index of a user may be calculated when the user first logs in, and/or periodically thereafter. In another implementation, the popularity index of the user depends on the popularity indices of all other users linked to the user, regardless of whether the other users are online at the time when the popularity index of the user is calculated.

After popularity indexes have been calculated for all users, users with the highest relative popularity indices may be identified. For example, the users with the highest 5% of popularity indices may be identified. Users may be granted or denied special permissions or status based on their popularity indices or relative ranking. For example, based on their popularity indices or relative ranking the identified users may be made able to send or receive large files as attachments to messages, or they may be given unlimited storage space.

As described with reference to processes 400 and 450, the popularity measurements for each user may be normalized based upon threshold values (430, 495). For example, the buddy quotient rating users provides users with an indication of how many Buddy Lists their screen names are on within the universe of lists that are currently online, and may be used to indicate how those results compare to the rest of the online universe and a rating that explains why their numbers are what they are. The buddy quotient rating can be used to inform users, such as instant messaging users, about privacy controls and improve to control and improve their messaging experience.

The system 120 can provide an expanded explanation of the significance of the user's buddy quotient rating, such as with a help screen, according to the following example which provides feedback similar to a horoscope. For example, a buddy quotient rating of between 0.00 and 1.00 (normalized rating of 1) is indicative of a decision maker and someone who is needed by a number of people to get work done. It may also mean that the user is controlling who can see the user, e.g., because the user has 70 or fewer contacts on their respective buddy list, but more users actually list the user on their respective lists. It may also mean that the user is only communicates with a select group of people. A rating of 1.01 to 2.00 (normalized rating of 2) indicates that the user is a decision maker, and therefore may have a larger staff or more responsibilities in the network or organization than someone with a rating of 1. A rating of between 2.01 to 3.00 (normalized rating of 3) indicates the user is very social, and may have a broad base of people who communicate with the user regardless of their stature in the network or organization. Ratings of between 3.01 to 6.00, or higher, may indicate that the user is extremely popular for either all of the above reasons or critical to many facets of an organization's operations. The buddy quotient ratings can be maintained in privacy for each user, or may be shared between user's, such as if agreed upon by the respective user's.

Figure 5:
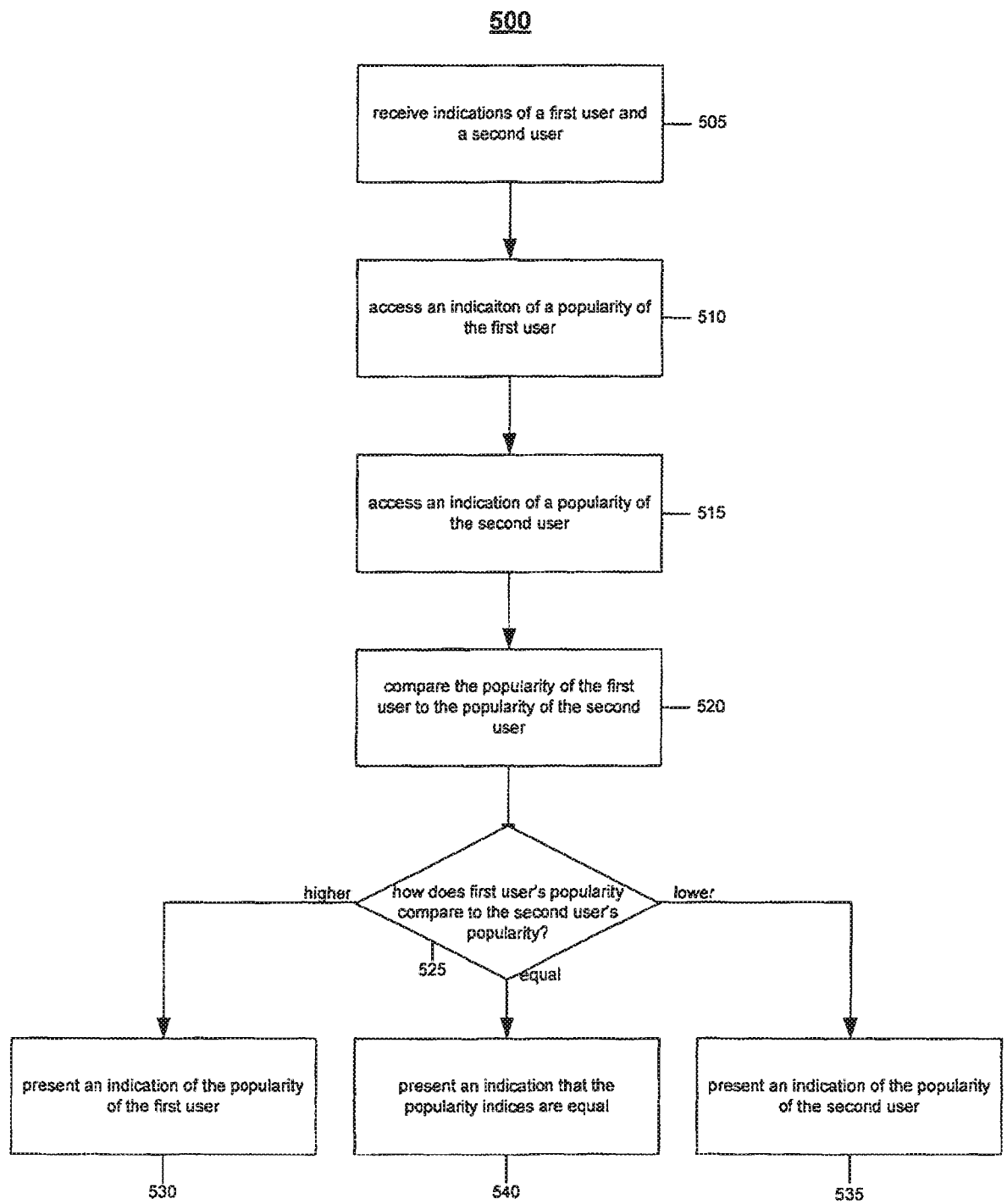
FIG. 5 is a flowchart of a process for presenting comparative popularities of a first identity and/or a second identity

Referring to FIGS. 5-7C, another application for the popularity indices may be to openly indicate which of two users has a higher popularity index. For example, two users may be provided, and the user with the higher popularity index may be identified. Such an application may be referred to as a fight or competition among the users. FIG. 5 is a flowchart of a process 500 for presenting comparative popularities of a first identity and/or a second identity. In process 500, a first user and a second user are designated for comparison (505). An indication of the popularity of the first user is accessed (510), such as through above-described processes 400, 450. An indication of the popularity of the second user is accessed (515), and the popularity measurements for each of the user's is compared (520). The results may be displayed for both user's to see, or only the outcome may be displayed for the competing user's. For example, if the first user's popularity exceeds the second user's popularity, an indication that the first user is the winner is displayed, e.g., with or without the supporting buddy quotient ratings of each user. If the first user's popularity is equal or less than the second user's popularity, respective indications of the tie (540) or relative popularity of the second user (535) is provided on the screen.

In the exemplary buddy quotient rating calculated and shown in FIG. 4C, the quotient rating is calculated by taking the number of buddies on their list divided into the number of online/total buddies. Alternatively, the buddy quotient rating may reflect one or more of the number of watchers, number of watchers who are their buddies, by expressing the percentage of buddies who are watchers and/or the ratio of the number of buddies who are watchers versus the number of watchers who are buddies (interesting/interested ratio). Alternatively, the buddy quotient rating (such as 0.23) may be derived by determining the number of my Buddies who have me on their lists (70) and subtracting the number of people who have me on their lists, whom I don't have on mine (33). The number of people the user is blocking who have the user on their lists (10) is subtracted by the result (37) to provide a number (27), and this number is divided by the total number of buddies on the user's list (103) to achieve a 0.23 buddy quotient.

Figure 6:
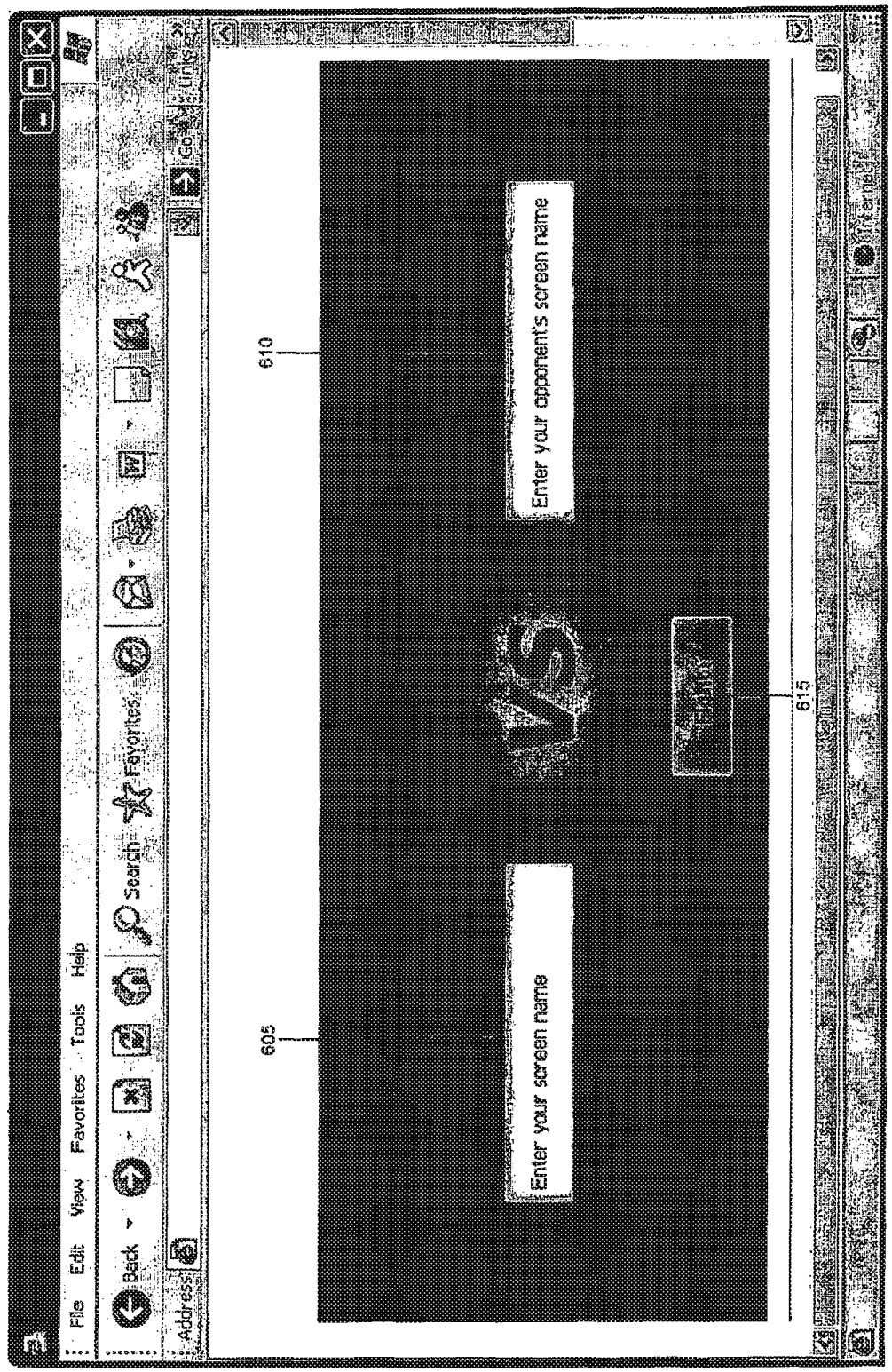
FIG. 6 is an exemplary initial screenshot for a comparison of popularity between a first identity and a second identity.
Figure 7A:
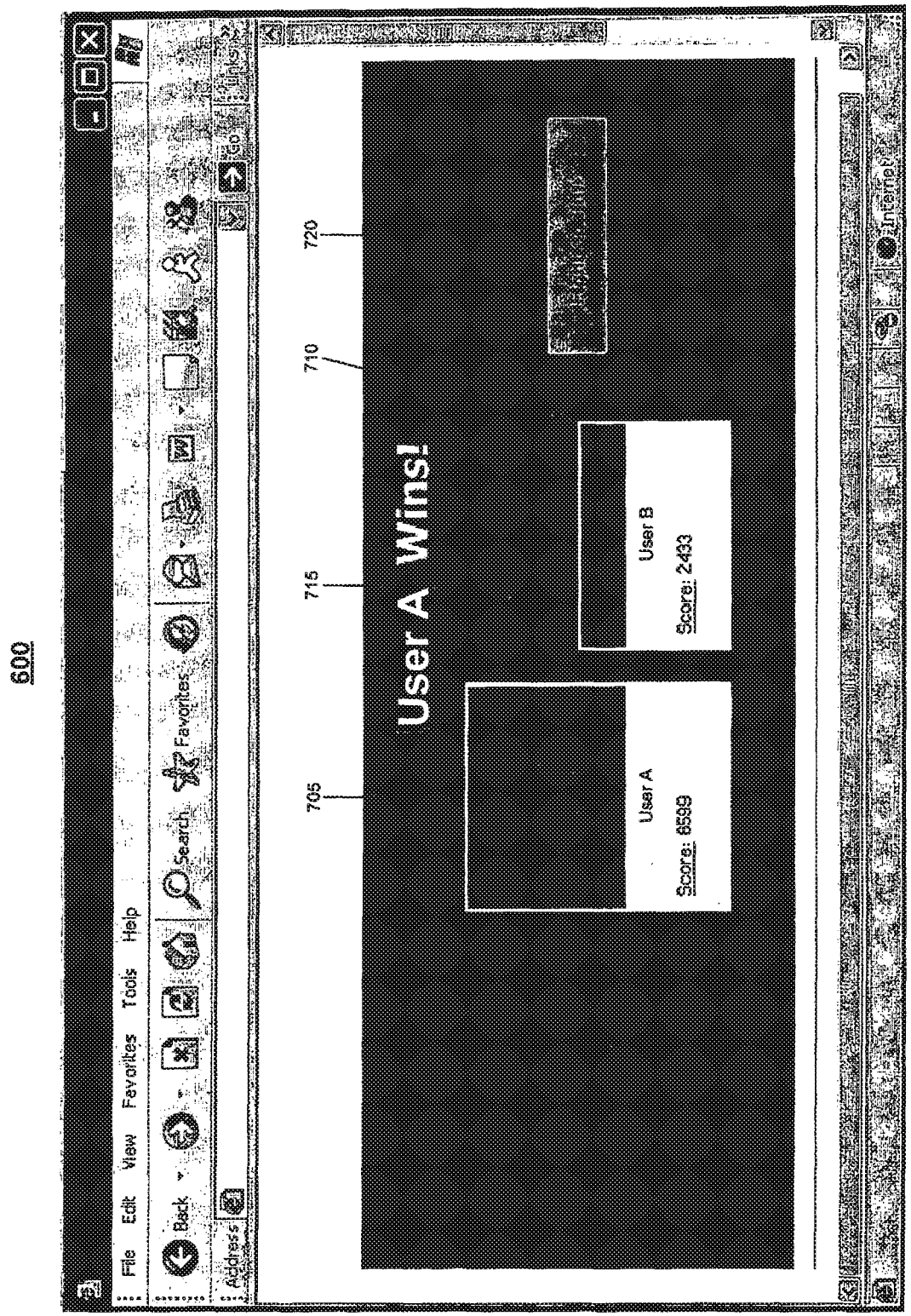
FIGS. 7A-7C are exemplary screenshots of comparative results between a first identity and a second identity.
Figure 7B:
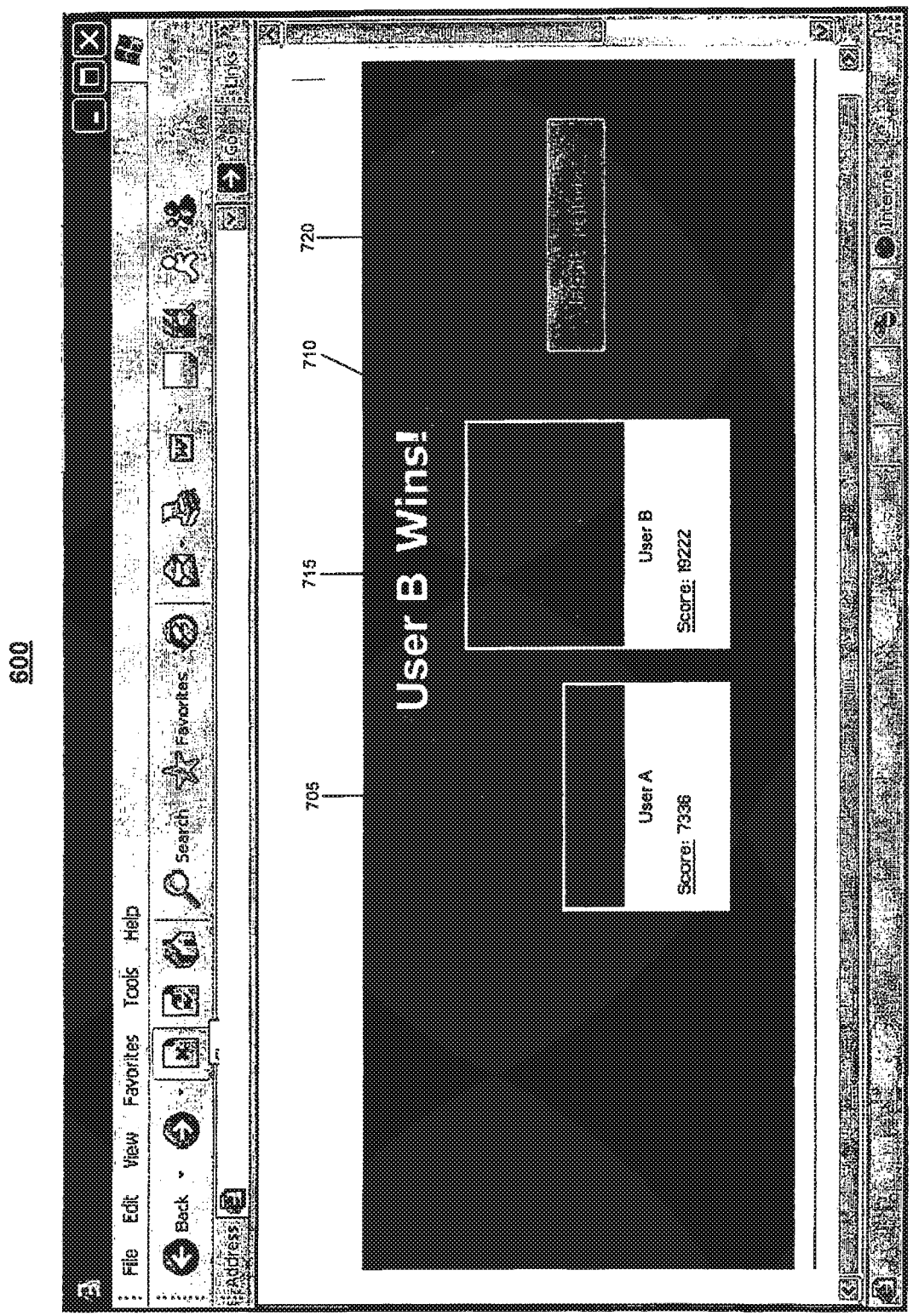
Figure 7C:
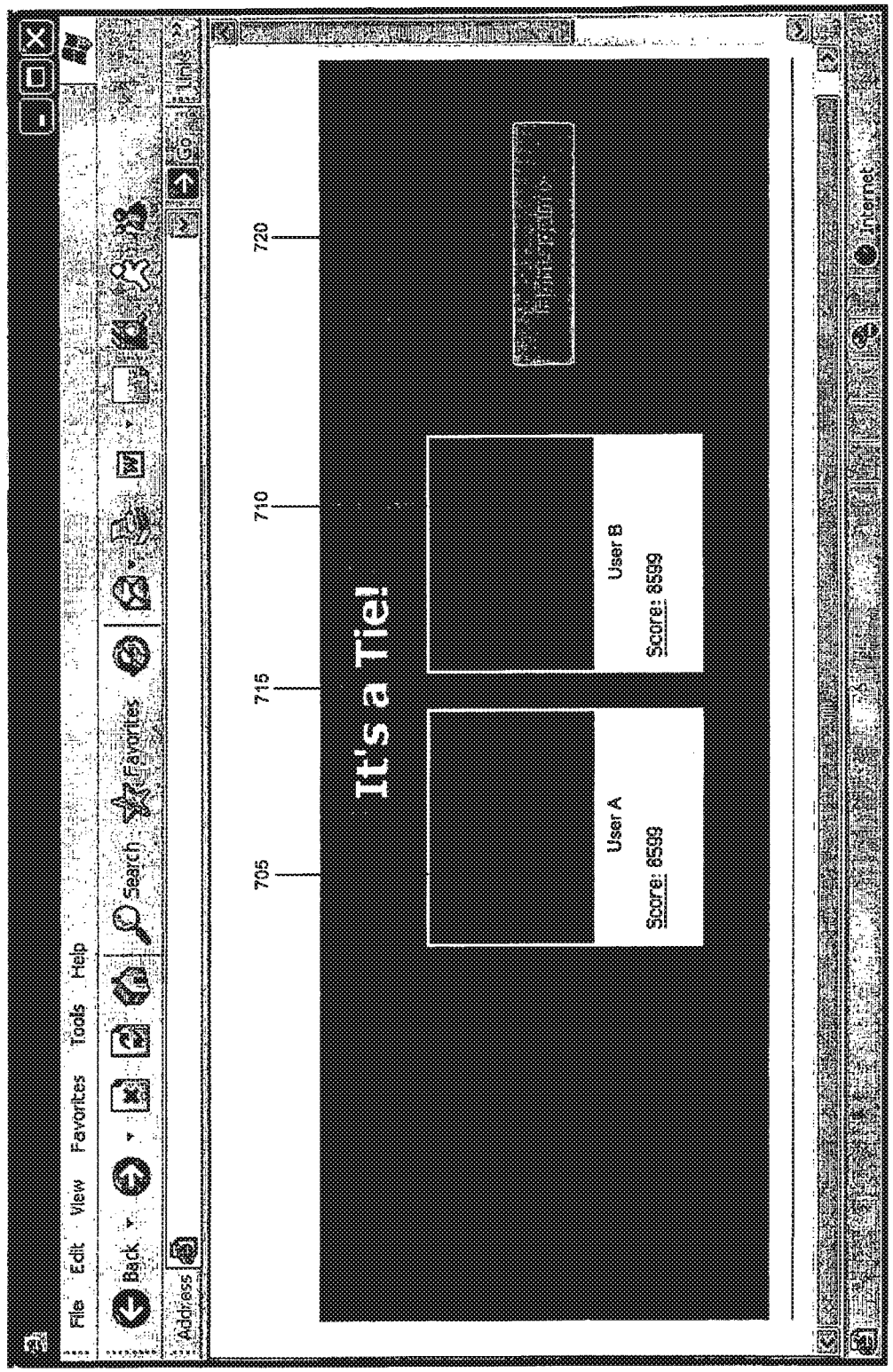

Referring to FIGS. 6-7C, a process 600 which corresponds to process 500 is shown in a collection of screenshots which represents the various steps of process 500 provided through a graphical user interface. FIG. 6 is an exemplary initial screenshot for a comparison of popularity between a first identity and a second identity, e.g., corresponding to step 505 in process 500 and initiated by the "fight" button 615. FIGS. 7A-7C are exemplary screenshots of comparative results between a first identity and a second identity, including user A wins (FIG. 7A), user B wins (FIG. 7B), and user A and user B tie (FIG. 7C). The popularity measurements can be prominently displayed or provided to the user with an audible tone or message indicative of competitive outcome or normalized popularity measurement.

An exemplary comparative process or competition between competing online users or identities is further described at http://aimfight.com/, the entirety of each of which is hereby incorporated by reference. For example, the on-line competition determines the popularity of individual users.

The use of a popularity measurement, or index, provides users with quantified feedback concerning the users activity in a social network, e.g., in the IM Today environment. For example, users can determine how many other users are blocking them, and/or how many watchers another screen name has associated with the screen name. The popularity measurement can be calculated manually, e.g., in response to user selection, or automatically, e.g., performed automatically by being refreshed periodically over an interval, such as a contact list or popularity measurement that is refreshed every 60 seconds. The popularity measurement also provides the user or content provider with the ability to control or enhance access to various system resources based on popularity measurement. For example, enhanced content or promotional incentives can be provided to a user in response to attaining various levels of popularity, such as controlling or enhancing a manner in which the user may send and receive electronic messages based on their popularity measurement. The contributions of various contacts, or the weighted value of the association with another user's contact list may be modified, reduced, or removed depending on several factors. For example, the user's popularity measurement may increase, if the user was manually added to another user's contact list versus automatically added to another user's contact list. In addition, or in the alternative, the user's popularity measurement can be updated by removing or adding the contribution of particular user(s) depending upon the online or offline state of the user(s).

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

Furthermore, elements of different implementations may be combined, deleted, added, supplemented or modified to yield further implementations. In addition, actions or communications do not necessarily need to occur in the order in which they are depicted. Accordingly, other implementations are within the scope of the following claims.

What is claimed is:

1. A method for determining user popularity in a social networking environment, the method comprising the following operations performed by at least one processor:
   identifying a first user in the social networking environment;
   identifying, based on at least one contact list, one or more other users in the social networking environment that are within a predetermined number of degrees of separation of the first user;
   determining a popularity measurement for each of the other users;
   aggregating the determined popularity measurements for the other users; and
   determining a popularity measurement for the first user based on at least the aggregated popularity measurement for the other users.

2. The method of claim 1, wherein identifying one or more other users comprises identifying the one or more other users based on the one or more other users being within the predetermined number of degrees of separation from the first user and the one or more other users having established a relationship with the first user.

3. The method of claim 2, further comprising identifying one or more other users that have established a relationship with the first user based on at least one other user having listed the first user in a contact list.

4. The method of claim 2, further comprising identifying one or more other users that have established a relationship with the first user based on at least one other user having listed an intermediate user through which the other user is related to the first user in a contact list.

5. The method of claim 1, further comprising:
   determining, for each of the other users, whether the other user was manually or automatically related to the first user; and
   for each of the other users, determining whether to include the popularity measurement of the other user when determining the popularity measurement of the first user based on whether the other user was manually or automatically related to the first user.

6. The method of claim 5, wherein determining whether to include the popularity measurement of the other user comprises including a greater contribution of the popularity measurement of the other user in the popularity measurement of the first user when the other user was manually related to the first user.

7. The method of claim 5, wherein determining whether the other user was manually or automatically related to the first user comprises determining whether an identifier of the first user was manually or automatically added to a contact list associated with the other user or with an intermediate user through which the first user and the other user are related.

8. The method of claim 1, wherein identifying one or more other users comprises identifying one or more other users based on the one or more other users being within a specified number of degrees of separation of the first user and on the one or more other users being online when the first user is identified.

9. The method of claim 8, further comprising:
   determining that one of the other users have transitioned to an offline state; and
   removing a contribution of the popularity measurement of the offline user from the popularity measurement of the first user.

10. The method of claim 9, further comprising:
    identifying another user within the predetermined degree of separation from the first user that is online;
    accessing a popularity measurement of the another user; and
    adding the popularity measurement of the another user to the popularity measurement of the first user.

11. The method of claim 1, wherein aggregating the popularity measurements of the other users into the popularity measurement for the first user comprises:
    determining, for each of the other users, a degree of separation between the other user and the first user; and
    including, for each of the other users, the popularity measurement of the other user in the popularity measurement of the first user based on the determined degree of separation.

12. The method of claim 1, wherein aggregating the popularity measurements of the other users into the popularity measurement for the first user comprises:
    determining for each of the other users, a number of electronic messages sent between the other users and at least the first user; and
    including, for each of the other users, the popularity measurement of the first user based on the determined number of messages.

13. The method of claim 1, further comprising controlling online behavior of the first user based on the popularity measurement of the first user.

14. The method of claim 13, wherein controlling online behavior of the first user comprises controlling a manner in which the first user may send and receive electronic messages.

15. The method of claim 13, wherein controlling online behavior of the first user comprises specifying a level of access to a resource that is provided to the first user.

16. A system for determining user popularity in a social networking environment, the system comprising:
    a memory storing instructions; and
    one or more processors configured to execute the instructions to:

identify a first user in the social networking environment;

identify, based on at least one contact list, one or more other users in the social networking environment that are within a predetermined number of degrees of separation of the first user;

determine a popularity measurement for each of the other users;

aggregate the determined popularity measurements for the other users; and determine a popularity measurement for the first user based on at least the aggregated popularity measurement for the other users.

17. The system of claim 16, wherein the one or more processors are further configure to:

determine, for each of the other users, whether the other user was manually or automatically related to the first user; and for each of the other users, determine whether to include the popularity measurement of the other user when determining the popularity measurement of the first user based on whether the other user was manually or automatically related to the first user.

18. The system of claim 17, wherein the one or more processors are further configure to:

include a greater contribution of the popularity measurement of the other user in the popularity measurement of the first user when the other user was manually related to the first user.

19. The system of claim 16, wherein the one or more processors are further configure to:

determine that one of the other users have transitioned to an offline state; and remove a contribution of the popularity measurement of the offline user from the popularity measurement of the first user.

20. The system of claim 19, wherein the one or more processors are further configure to:

identify another user within the predetermined degree of separation from the first user that is online;

access a popularity measurement of the another user; and add the popularity measurement of the another user to the popularity measurement of the first user.

* * * * *